(12) United States Patent
De Groot et al.

(10) Patent No.: US 6,822,745 B2
(45) Date of Patent: Nov. 23, 2004

(54) OPTICAL SYSTEMS FOR MEASURING FORM AND GEOMETRIC DIMENSIONS OF PRECISION ENGINEERED PARTS

(75) Inventors: Peter De Groot, Middletown, CT (US); Xavier Colonna De Lega, Middletown, CT (US); David Grigg, Glastonberry, CT (US); James Biegen, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 269 days.

(21) Appl. No.: 09/769,859

(22) Filed: Jan. 25, 2001

(65) Prior Publication Data

US 2001/0043333 A1 Nov. 22, 2001

Related U.S. Application Data

(60) Provisional application No. 60/177,912, filed on Jan. 25, 2000, and provisional application No. 60/205,736, filed on May 19, 2000.

(51) Int. Cl.⁷ .......................... G01B 9/02; G01B 11/02
(52) U.S. Cl. ...................... 356/496; 356/485; 356/492; 356/497; 356/511
(58) Field of Search ................................ 356/485–489, 356/495, 497, 503, 511–514, 516, 520, 521

(56) References Cited

U.S. PATENT DOCUMENTS

| | | | |
|---|---|---|---|
| 5,363,196 A | 11/1994 | Cameron | |
| 5,398,113 A | 3/1995 | de Groot | |
| 5,502,564 A | 3/1996 | Ledger | 356/355 |
| 5,598,265 A | 1/1997 | de Groot | |
| 5,654,798 A * | 8/1997 | Bruning | 356/512 |
| 5,777,738 A | 7/1998 | Kulawiec | |
| 5,793,488 A * | 8/1998 | Kulawiec et al. | 356/512 |
| 5,969,800 A * | 10/1999 | Makinouchi | 355/53 |
| 5,987,189 A | 11/1999 | Schmucker et al. | 382/284 |
| 6,100,977 A | 8/2000 | Muller | 356/354 |
| 6,183,315 B1 | 2/2001 | McHugh et al. | 382/108 |
| 6,271,925 B1 * | 8/2001 | Muller | 356/512 |
| 6,392,752 B1 * | 5/2002 | Johnson | 356/511 |
| 6,597,460 B2 | 7/2003 | Groot et al. | 356/512 |

FOREIGN PATENT DOCUMENTS

| | | |
|---|---|---|
| EP | 0 179 935 | 5/1986 |
| EP | 0 352 535 | 1/1990 |
| WO | WO 99/02938 | 1/1999 |

OTHER PUBLICATIONS

R.W. Ditchburn, *Light*, Dover Publications, Inc., published in 1991, Reprint, Originally published: New York: Interscience Publishers 1961. pp. 272–273.

Dresel et al., "Three Dimensional Sensing of Rough Surfaces by Coherence Radar," Applied Optics, 31 7:919–925, Mar. 1, 1992.

Ikonen et al., "Interferometric Calibration of Gauge Blocks by Using One Stabilized Laser and a White–light Source," Applied Optics, 30:31:4477–4478, Nov. 1,1991.

(List continued on next page.)

*Primary Examiner*—Edward J. Glick
*Assistant Examiner*—Thomas R Artman
(74) *Attorney, Agent, or Firm*—Fish & Richardson P.C.

(57) ABSTRACT

The invention features a method for determining a geometric property of a test object, the method including: interferometrically profiling a first surface of the test object in a first coordinate system; interferometrically profiling a second surface of the test object in a second coordinate system different from the first coordinate system; providing a relationship between the first and second coordinate system; and calculating the geometric property based on the interferometrically profiled surfaces and the relationship between the first and second coordinate system. In some embodiments, the relationship may be determined by using calibrated gage blocks or by using a displacement measuring interferometer. Corresponding system are also described.

71 Claims, 23 Drawing Sheets

OTHER PUBLICATIONS

Lewis, "Measurement of Length, Surface Form and Thermal Expansion Coefficient of Length Bars up to 1.5 m Using Multiple–wavelength Phase–stepping Interferometry," Meas. Sci. Technol. 5 694–703, (1994).

Malinovsky et al., "Toward Subnanometer Uncertainty in Interferometric Length Measurements of Short Gauge Blocks," Applied Optics, 38:1:101–112, Jan. 1, 1999.

Nurge et al., "Measurement of Curvature and Thickness Variations of Flat Cuboids by Grazing Incidence Interferometry," Annual Report. Physikalisches Institut Universitat Erlangen–Nurnberg, Lehrstuhl fur Optik, (Druckerei Lengenfelder, Erlangen, Germany, 1998, p. 30.

Poole et al., "Application of Interferometry to the Routine Measurement of Block Gauges," Optics and Metrology, Pol Mollet. Ed., Pergamon Press, New York, 1960.

Pugh et al., "Automatic Gauge Block Measurement Using Multiple Wavelength Interferometry," SPIE, 656:244–250, 1986.

Denes et al., "Flatness, Parallelism and Oyther Novel Uses of Grazing–Incidence Interferometry in Precision Engineering," Proceedings of the ASPE, 11:20–23 (1995).

Copy of International Search Report, dated Oct. 16, 2001.

* cited by examiner

OPTICAL SYSTEMS FOR MEASURING FORM AND GEOMETRIC DIMENSIONS OF PRECISION ENGINEERED PARTS

CROSS-REFERENCE TO RELATED APPLICATIONS

This application claims priority from U.S. provisional patent application 60/177,912, filed Jan. 25, 2000 and U.S. provisional patent application 60/205,736, filed May 19, 2000. The contents of both provisional applications are incorporated herein by reference.

BACKGROUND OF THE INVENTION

The invention relates to optical methods and means for determining and/or verifying the geometric dimensions of precision-engineered parts.

The fabrication of precision-engineered components is governed by standard practice in geometric dimensioning and tolerancing (GD&T). Metrology for GD&T requires accurate determination of surface form as well as relationships between part surfaces. The metrology must be accurate and conform to international standards, and preferably takes no more than a few seconds. Surface forms of interest include, for example, opposing plane parallel surfaces, orthogonal plane surfaces, disconnected planar, cylindrical and spherical surfaces, and component surfaces of an assembly.

SUMMARY OF THE INVENTION

The invention features optical systems and methods that determine absolute positions of points on potentially disconnected surfaces on a test part with respect to a common reference frame. Such systems and methods allow a user to verify, for example, that the location, relative orientation, and form of part features conform to specifications.

The invention includes an optical system having one or more optical profilers adapted to view a test part from different perspectives. Each profiler is capable of measuring absolute positions of surface points in three dimensions with respect to a coordinate system local to each profiler. The invention further includes initialization and calibration procedures to relate the coordinate systems of each profiler to the other, so as to relate each measured surface position to all others. Such procedures can employ, for example, mechanical standard artifacts or a distance measuring laser interferometer, to provide information regarding the separation and relative orientation of the two corresponding optical profiler coordinate systems. Suitable optical profilers include triangulation systems, time of flight systems, and optical interferometers, such as height-scanning interferometers, which employ mechanical or equivalent scans perpendicular to the surface to obtain a localized (e.g. coherence-limited) interference pattern for each image pixel. As described in greater detail below, height-scanning interferometers that employ infrared sources can be particularly advantageous when working with test parts having relatively rough surfaces.

In general, in one aspect, the invention features a method for determining a geometric property of a test object. The method includes: interferometrically profiling a first surface of the test object with respect to a first datum surface; interferometrically profiling a second surface of the test object in a second coordinate system with respect a second datum surface different from the first datum surface; providing a spatial relationship between the first and second datum surfaces; and calculating the geometric property based on the interferometrically profiled surfaces and the spatial relationship between the first and second datum surfaces.

Embodiments of the method can include any of the following features.

The interferometric profiling of the first surface can provide a distance to each of a plurality points on the first surface from a corresponding point on the first datum surface. Similarly, the interferometric profiling of the second surface can provide a distance to each of a plurality points on the first surface from a corresponding point on the first datum surface.

One or both of the datum surfaces can be a portion of a plane, a curved surface, or have a structured profile.

The first surface of the test object can be spaced from the second surface. The first and second surfaces can correspond to opposite faces of the test object. The first and second surfaces can correspond to adjacent faces of the test object. The first and second surfaces can be adjacent faces separated by a step height. The first and second surfaces can be displaced from one another by a distance greater than a range of the interferometric profiling of the first surface and greater than a range of the interferometric profiling of the second surface.

The interferometric profiling of the first surface can include directing electromagnetic radiation to the first surface along a first direction and the interferometric profiling of the second surface includes directing electromagnetic radiation to the second surface along a second direction different from the first direction. The interferometric profiling of the first surface can include positioning the test object relative to an interferometry system and the interferometric profiling of the second surface includes repositioning the test object relative to at least one component of the interferometry system. For example, the repositioning of the test object relative to the interferometry system can include moving the test object or moving the at least one component of the interferometry system. In the latter case, the method can further include measuring the movement of the at least one component of the interferometry system to determine the spatial relationship between the first and second datum surfaces.

The relationship between the first and second datum surfaces can be defined by a distance between corresponding reference points on the first and second datum surfaces and two angles defining a relative orientation of the first and second datum surfaces.

The method can further including determining the spatial relationship between the first and second datum surfaces.

For example, determining the relationship between the first and second coordinate system can include: interferometrically profiling a first surface of a reference object with respect to the first datum surface; interferometrically profiling a second surface of the reference object with respect to the second coordinate system; providing at least one calibrated dimension for the reference object; and calculating the spatial relationship between the first and second datum surfaces based on the profiled surfaces and the at least one calibrated dimension. The reference object can be selected according to approximate dimensions of the test object.

The method can further including determining the spatial relationship between the first and second datum surfaces based on at least one interferometric displacement measurement. For example, the spatial relationship can be determined based on the at least one interferometric distance measurement and an initial calibration. The method can further include adjusting at least one of the first and second datum surfaces to accommodate the interferometric profiling of the first and second surfaces of the test object and interferometrically measuring the adjustment of the at least one of the first and second datum surfaces to determine the spatial relationship between the first and second datum surfaces.

The spatial relationship can also be determined by: interferometrically profiling a first surface of a initialization artifact with respect to the first datum surface; interferometrically profiling a second surface of the initialization artifact with respect to the second datum surface; calculating an initial spatial relationship between the first and second datum surfaces based on at least the profiled surfaces of the initialization artifact; adjusting the first and second datum surfaces to accommodate the first and second surfaces of the test object, and interferometrically measuring at least one displacement corresponding to the adjustment of the first and second datum surfaces. For example, the first and second surfaces of the initialization artifact can be the front and back of a common interface. Furthermore, the method can provide at least one calibrated dimension for the initialization artifact, and the calculation of the initial relationship can be based on the profiled surfaces of the initialization artifact and the at least one calibrated dimension.

The geometric property can be any of: flatness of the test object; thickness of the test object; parallelism of the test object; a step height; the angular orientation of the first surface relative to the second surfaces (e.g., perpendicularity of the first and second surfaces); and roundness of the test object. Often, the geometric property is defined by positions in a common coordinate system of a plurality of points on the first surface and a plurality of points on the second surface.

The interferometric profiling of at least one of the first and second surfaces can include any of: performing scanning, white light interferometry; performing infrared, scanning interferometry; performing scanning MESA interferometry; performing scanning, (grazing-incidence interferometry; and performing multiple wavelength interferometry.

The test object can also be partially transparent and the geometric property can relate to the positions of points on opposite sides of the partially transparent test object. The first and second surfaces of the test object can be interferometrically profiled from a common side and the first and second datum surfaces can be spaced from one another by a distance greater than a profiling range η of an interferometry system used for the interferometric profiling steps. Furthermore, the interferometry system used for the interferometric profiling steps can include a reference object having a partially reflective, first surface and a reflective, second surface, the first surface defining the first datum surface and the second surface defining the second datum surface. The spatial relationship can be defined by the spatial separation between the first and second surfaces of the reference object.

In general, in another aspect, the invention features an apparatus for determining a geometric property of a test object. The apparatus includes: means for interferometrically profiling a first surface of the test object with respect to a first datum surface; means for interferometrically profiling a second surface of the test object with respect to a second datum surface different from the first datum system; and means for calculating the geometric property based on the interferometrically profiled surfaces and a spatial relationship between the first and second datum surfaces. The apparatus can further include means for determining the spatial relationship between the first and second datum surfaces.

In general, in another aspect, the invention features an apparatus for determining a geometric property of a test object. The method includes: an interferometric profiling system which during operation interferometrically profiles a first surface of the test object with respect to a first datum surface and interferometrically profiles a second surface of the test object with respect to a second datum surface different from the first datum surface; and an electronic processor coupled to the interferometric profiling system, wherein during operation the electronic processor calculates the geometric property based on the interferometrically profiled surfaces and a spatial relationship between the first and second datum surfaces.

Embodiments of the apparatus can include any of the features described above relating to the method as well as any of the following features.

The interferometric profiling system can include a mount for supporting the test object, wherein the mount is adjustable between a first position for exposing the first surface of the test object and defining the datum surface and a second position for exposing the second surface of the test object and defining the second datum surface.

The interferometric profiling system can includes an interferometric optical profiler having a first viewing port for viewing the first surface of the test object and a second viewing port for viewing the second surface of the test object. For example, the optical profiler can include a first camera positioned to record a field of view for the first viewing port and a second camera positioned to record a field of view for the second viewing port. Alternatively, the optical profiler can include a camera positioned to record a split field of view for the first and second viewing ports. The optical profiler can include at least one source of EM radiation. The optical profiler can further include a first optic positioned to direct a first portion of the EM radiation towards the first viewing port and a second portion of the EM radiation towards the second viewing ports. For example, the first optic can be a beam splitting optic positioned to reflect the first portion of the EM radiation towards the first viewing port, reflect the second portion of the EM radiation towards the second viewing port, and transmit at least one additional portion of the incident EM radiation through the beam splitting optic. The optical profiler can further include a reflective reference surface positioned to receive the at least one additional portion of the incident EM radiation transmitted through the beam splitting optic. Furthermore, the optical profiler can include a transducer coupled to the reflective reference surface for scanning the position of the reflective reference surface.

The optical profiler can include a first viewing port optic supported by a first movable stage, the first viewing port optic positioned to direct at least one part of the first portion of the EM radiation towards the first surface of the test object and the first movable stage adjustable to accommodate the interferometric profiling of the first surface of the test object. Furthermore, the optical profiler can include a second viewing port optic supported by a second movable stage, the second viewing port optic positioned to direct at least one part of the second portion of the EM radiation towards the second surface of the test object and the second movable stage adjustable to accommodate the interferometric profiling of the second surface of the test object. For example, the first reflective optic can be a roof mirror. The optical profiler can further includes a first fold mirror for further directing the at least one part of the first portion of the EM radiation towards the first surface of the test object. The apparatus can also include a displacement measuring interferometer positioned to measure changes in the spatial relationship between the first and second datum surfaces caused by at least one of an adjustment to the first movable stage and an adjustment to the second movable stage.

The interferometric profiling system can include a first interferometric optical profiler for viewing the first surface of the test object and a second interferometric optical profiler for viewing the second surface of the test object. For example, the first optical profiler can be movable relative to the second optical profiler to adjust the spatial relationship between the first and second datum surfaces. Furthermore, the apparatus can include a displacement measuring interferometer positioned to measure changes in the spatial relationship between the first and second datum surfaces caused by relative movement of the first and second optical profilers.

The interferometric profiling system can also include a moveable stage adjustable from a first position defining the first datum surface to a second position defining the second datum surface.

The apparatus can further include a gauge object having first and second surfaces, the first surface being positioned to be profiled by the interferometric profiling system with respect to the first datum surface and the second surface being positioned to be profiled by the interferometric profiling system with respect to the second datum surface. In such embodiments, the electronic processor can determine the spatial relationship between the first and second datum surfaces based on interferometric profiling measurements of the first and second surfaces of the gauge object provided by the first and second optical profilers and, if necessary, at least one calibrated dimension for the gauge object. Furthermore, in some embodiments, the gauge object can be positioned to be in a field of view of the interferometric profiling system during the interferometric profiling of the test object.

The apparatus can further include a displacement measuring interferometer positioned to measure the spatial relationship between the first and second datum surfaces.

The electronic processor can use at least one value indicative of PCOR dispersion in the interferometric profiling system and the test object to calculate the geometric property.

In general, in another aspect, the invention features an apparatus for determining a geometric property of a test object. The apparatus includes: an interferometric profiling system which during operation interferometrically profiles a first surface of the test object with respect to a first datum surface and interferometrically profiles a second surface of the test object with respect to a second datum surface, wherein the interferometric profiling system includes at least one movable stage for adjusting the position of the first datum surface and the second datum surface; a displacement measuring interferometer positioned to measure a change in a relative position of the first and second datum surface caused by an adjustment to the at least one movable stage; and an electronic processor coupled to the interferometric profiling system and the displacement measuring interferometer, wherein during operation the electronic processor calculates the geometric property based on the interferometrically profiled surfaces and the relative position of the first and second datum surfaces.

Embodiments of this aspect can include any of the following features.

The interferometric profiling system can includes a second moveable stage, and during operation the first-mentioned movable stage adjusts the position of the first datum surface and the second movable stage adjusts the position of the second datum surface. Alternatively, the at least one movable stage can include a first movable stage adjustable from a first position defining the first datum surface to a second position defining the second datum surface.

The displacement measuring interferometer can provide multiple axes of measurement (e.g., 2 or 3). The scanning interferometric profiling system can use infrared or visible wavelengths.

In general, in another aspect, the invention features a method for determining a geometric property of a test object. The method includes: profiling a first surface of the test object in a first coordinate system; profiling a second surface of the test object in a second coordinate system different from the first coordinate system; determining a spatial relationship between the first and second coordinate system based on at least one interferometric distance measurement; and calculating the geometric property based on the profiled surfaces and the relationship between the first and second coordinate system.

In general, in another aspect, the invention features a method for determining a geometric property of a test object. The method includes: interferometrically profiling a first surface of the test object with respect to a first datum surface; interferometrically profiling a second surface of the test object with respect to a second datum surface different from the first datum surface; determining a spatial relationship between the interferometrically profiled surfaces which accounts for PCOR dispersion; and calculating the geometric property based on the interferometrically profiled surfaces and the spatial relationship.

In general, in another aspect, the invention features an optical profiling system including: a broadband source; a scanning interferometer which during operation directs a first wavefront along a reference path including a partially reflective first surface and a reflective second surface and a second wavefront along a measurement path contacting a measurement object, and, after the second wavefront contacts the measurement object, combines the wavefronts to produce an optical interference pattern; a detector producing interference data in response to the optical interference pattern; an electronic processor coupled to the detector for analyzing the interference data; and a scanning controller coupled to the scanning interferometer and the electronic processor, wherein during operation the scanning controller causes the scanning interferometer to adjust the position of the first and second surfaces. In some embodiments, the partially reflective first surface of the scanning interferometer defines a first datum surface and the reflective second surface defines a second datum surface, and during operation the electronic processor calculates a geometric property of the test object based on the interference data and a relationship between the first and second datum surfaces.

Embodiments of the invention include many advantages. For example, they can provide high data density, absolute surface topography maps of two or more surfaces of a test part with respect to a common xyz coordinate system. Such topography maps can be used to verify that the geometric dimensions of precision-engineered parts conform to specified tolerances.

Other aspects, advantages, and features of the invention follow.

DETAILED DESCRIPTION

The invention features optical systems and methods that determine absolute positions of points on potentially disconnected surfaces on a test part with respect to a common reference frame. Of particular interest are opposing plane parallel surfaces, orthogonal plane surfaces, disconnected planar, cylindrical and spherical surfaces, and component surfaces of an assembly. In what follows, first we will describe measurement requirements and how interferometric profilers can perform such measurements, then calibration is handled, using either gage blocks or a laser to establish thickness and parallelism scales. Then sample systems will be described, followed by a discussion of additional embodiments.

Measurements

Often one wants to verify that machined parts conform to GD&T specifications in accordance with national and international standards for engineering drawings. The ASME document Y14.5M-1994 (the "ASME Standards") defines GD&T practice in the US. The definitions contained in the ASME Standards relate closely to the way a skilled machinist would manufacture, verify and assemble parts. For example, for a part having opposing plane parallel surfaces, specifications of interest include flatness, thickness, and parallelism (FTP).

As an example, a flatness tolerance usually specifies a zone defined by two parallel planes within which a surface must lie. Iterative fitting of two parallel planes is used to find the minimum separation encompassing all of the data points.

Figure 1:
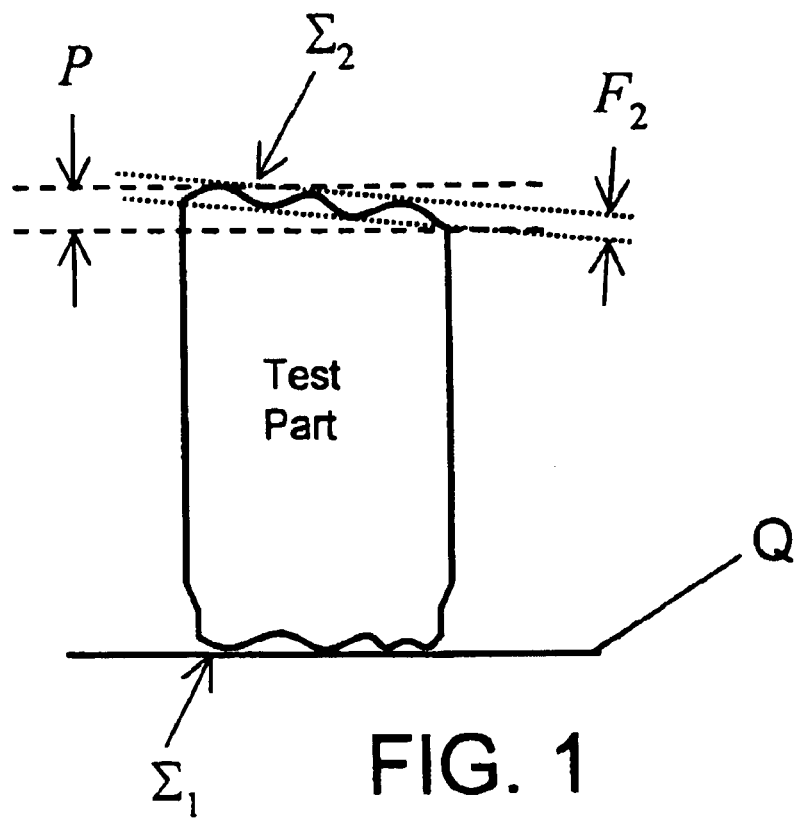
FIG. 1 is a drawing illustrating common definitions for flatness and parallelism.

A parallelism tolerance often specifies a zone within which a surface lies, defined by two planes both parallel to a datum plane. FIG. 1 summarizes flatness (F) and parallelism (P) for an example part having two opposing surfaces $\Sigma_2$ and $\Sigma_1$. The datum plane Q is a theoretically exact plane in contact with the lower surface or a designated feature $\Sigma_1$ of the part. Parallelism is the minimum separation of two planes parallel to the datum Q that contain the entire upper surface $\Sigma_2$ of the part. Evidently, the parallelism tolerance is greater than or equal to the flatness tolerance.

There are several relevant interpretations of thickness consistent with GD&T:

Thickness 1=Profile with respect to a datum: One approach is to tolerance a profile with respect to the part datum Q in FIG. 1. This datum-referenced profile tolerance incorporates the basic dimension from surface $\Sigma_1$ to surface $\Sigma_2$. For the purpose of sorting the part according to thickness, the measured thickness may be considered the average distances from the datum Q of the two planes used to verify the parallelism of surface $\Sigma_2$ with respect to the designated surface $\Sigma_1$.

Figure 2:
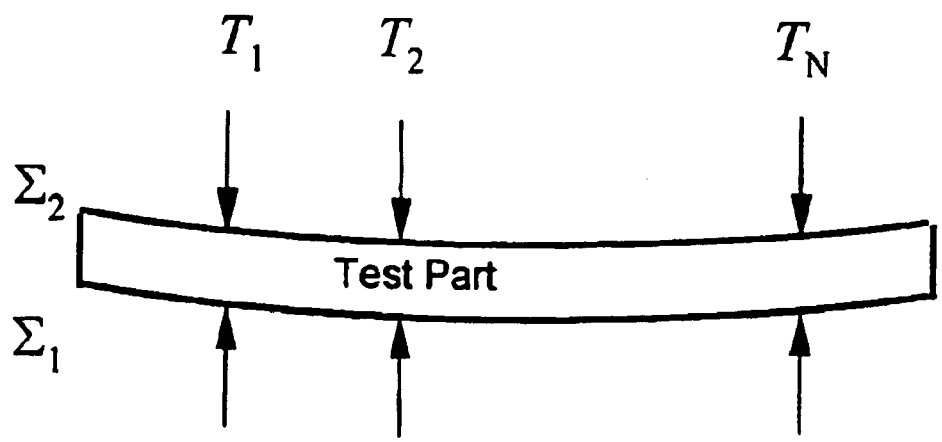
FIG. 2 is a drawing illustrating a part thickness measurement.

Thickness 2=Actual local size: A second possibility associates thickness with actual local size, which is the value of any individual distance at any cross section of a feature, as shown in FIG. 2, e.g., local size values $T_{1,2,\ldots N}$. Actual local size does not involve a reference to a datum. We propose to take the average of the maximum and minimum actual local size and call this measured thickness. In this case, and only in this case, it is possible to have the thickness tolerance be smaller than the parallelism tolerance.

Figure 3:
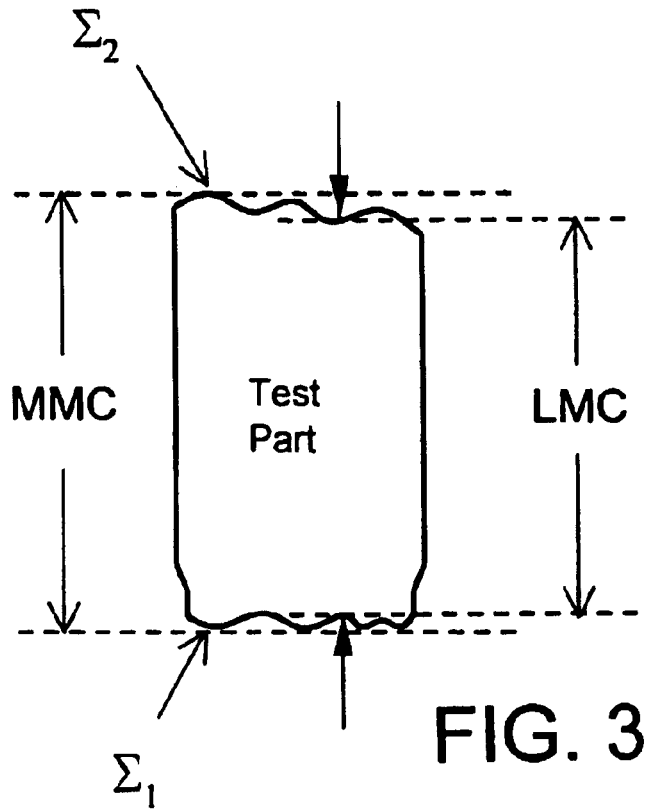
FIG. 3 is a drawing illustrating another part third thickness measurement.

Thickness 3=Size: Yet a third interpretation of thickness is to consider it a synonym for part size. Once again, part size does not involve a reference to a datum. Rather, the definitions of MMC (maximum material condition) and LMC (minimum material condition) control part size. The MMC corresponds to the largest allowable separation of two parallel planes entirely containing the part. It is therefore the analog of flatness applied to the entire part. The LMC corresponds to the smallest allowable separation of any two opposing points on surfaces $\Sigma_1$ and $\Sigma_2$. The average of the LMC and the MMC and is a third possible definition of thickness (FIG. 3).

TABLE 1

| Parameter | Minimum optical metrology requirement |
|---|---|
| Flatness | Relative surface topography maps of both sides of the part. |
| Parallelism. | Relative distance between any point on the map with respect to a datum plane established by the designated surface |
| Thickness 1 | Absolute distance between any point on the map with respect to a datum plane established by the designated surface |
| Thickness 2. | Absolute distance between any two points on the two opposing surfaces having the same lateral x,y position. |
| Thickness 3. | Absolute surface topography maps of both sides of the part with respect to a common x,y,z coordinate system. |

As illustrated in Table 1, to accommodate all of these potential GD&T definitions into an optical FTP measurement system, one distinguishes between relative surface topography measurements, which may have an arbitrary constant offset, and absolute measurements, which do not have this ambiguity. Evidently, the thickness definition 3 drives the requirements. If we collect all of the data necessary to calculate part size, then we have all of the information necessary for all of the other GD&T characteristics. We also have all of the necessary data to satisfy virtually any other meaningful definitions of FTP. Therefore, it is advantageous to have a metrology tool that provides high data density, absolute surface topography maps of both sides of a test part with respect to a common coordinate system.

Figure 4:
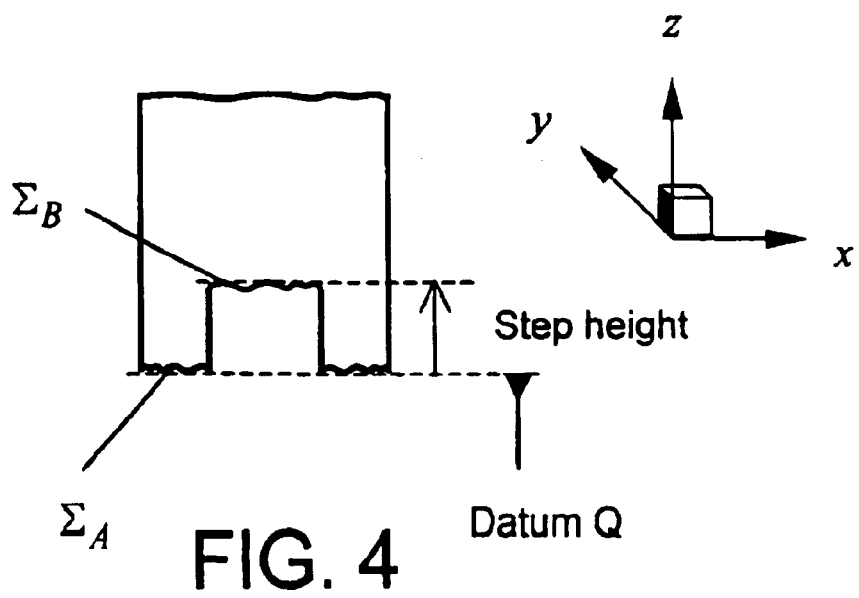
FIG. 4 is a drawing illustrating a step-height measurement.

Similarly, for other applications, it is advantageous to have a metrology tool that provides high data density, absolute surface topography maps of disconnected surfaces $\Sigma_A, \Sigma_B$ of a test part with respect to a common coordinate system. For example, the disconnected surfaces may separated from one another by a step height, and the measurements of interest for the part may include flatness, parallelism, and the step-height (FP-H) of the disconnected surfaces, as illustrated in FIG. 4. For example, one of the surfaces, e.g., $\Sigma_A$, could be fit to a plane to define the datum surface, and the step height could be defined as the average of the highest and lowest point on the recessed surface $\Sigma_B$ with respect to this datum.

As described further below, additional measurements of interest include the orthogonality of different part surfaces, or more generally, the geometric relationship of one part surface (e.g., a planar, curved, or structured surface) to another part surface. Generally, such geometric properties can be determined by measuring positions in a common coordinate system of a plurality of points on the first surface and a plurality of points on the second surface.

Optical FTP Systems

Embodiments of the present invention make use of optical profilers to measure a height $h_{H\Sigma}$ within a restricted range η for any given point x,y on a surface $\Sigma$ with respect to an optical profiler datum H. For example, such height measurements are characteristic of scanning height-measurement interferometers, e.g., the NewView 5000 from Zygo Corp. (Middletown, Conn.), for which η is the Pow-Foc scan range of 100 microns. The position and orientation of the NewView optical profiler datum are related to the starting point of the PowFoc scan as well as the locations of all optical components that influence the peak fringe contrast position. Using two such optical profilers to profile two part surfaces and relating the two corresponding optical profiler datums $H_1$, $H_2$ for the profiling, provides information sufficient for FTP, FPH, and other such geometric part properties.

Figure 5:
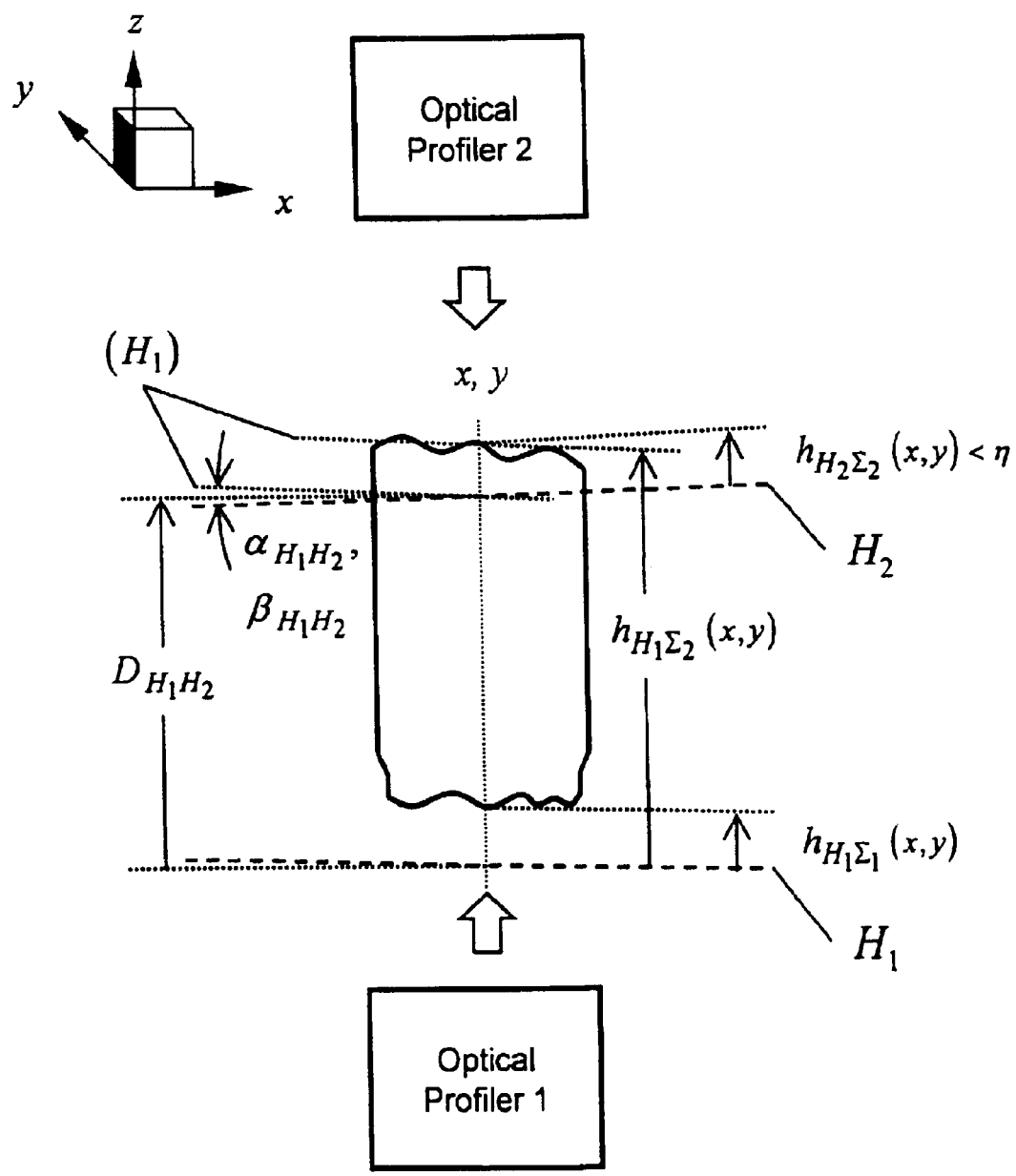
FIG. 5 is a schematic drawing of a two-sided all-optical FTP system.

FIG. 5 illustrates an all-optical FTP measurement involving two surface height profiles $h_{H_1\Sigma_1}$, $h_{H_2\Sigma_2}$ taken either by independent optical profilers or by one profiler having two opposing viewing ports. The two planes labeled ($H_1$) are parallel to $H_1$. Knowing the relationship between the two optical profiler datum planes $H_1$, $H_2$ by means of a prior calibration, we can reference both surface profiles to a common plane, e.g. $H_1$:

$$h_{H_1\Sigma_2}(x,y) = D_{H_1H_2} + h_{H_2\Sigma_2}(x,y) + x\tan(\alpha_{H_1H_2}) + y\tan(\beta_{H_1H_2}). \quad (1)$$

Here $D_{H_1H_2}$ is the distance from $H_1$ to $H_2$ at x=0, y=0, and $\alpha_{H_1H_2}$, $\beta_{H_1H_2}$ are the tip and tilt angles between these two planes. Knowing $h_{H_1\Sigma_1}$ and $h_{H_2\Sigma_2}$ for all x,y is sufficient to satisfy the needs of the FTP measurements in Table 1.

Figure 6:
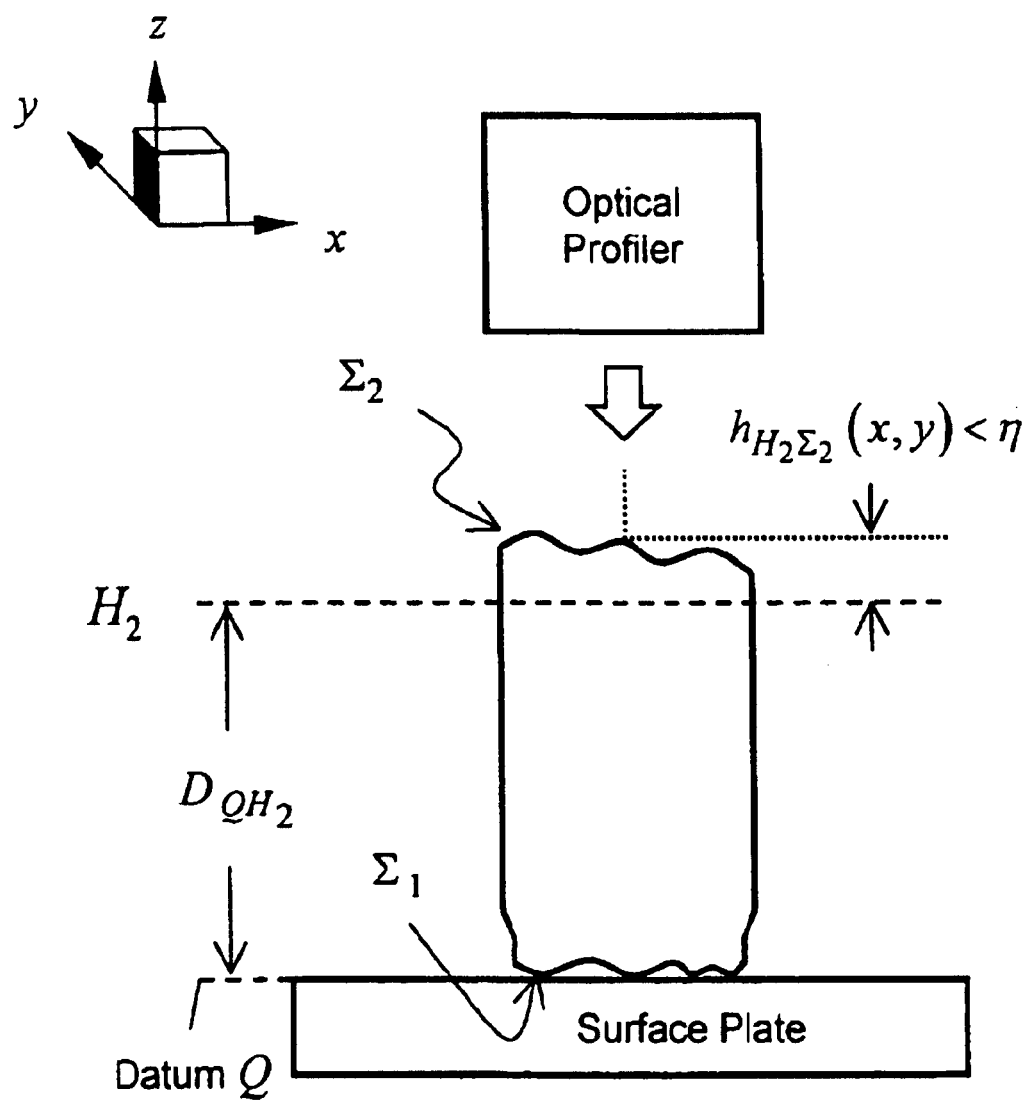
FIG. 6 is a schematic drawing of a single-sided optical FTP using a surface plate to simulate the part datum.

An alternative to viewing the part from both sides for FTP measurements is to view it from one side only, using a mechanical datum simulator such as a surface plate (FIG. 6). This satisfies the flatness, parallelism and thickness-1 requirements outlined in Table 1, provided that the contact with the surface plate is repeatable and reliable. Fixturing would be straightforward, and the object would be turned over to measure both sides for flatness. Furthermore, FPH measurements can be made using a single optical profiler by translating the optical profiler with respect to the part to sequentially view the disconnected surfaces. Moreover, embodiments can include a single optical profiler system in which the part is supported by an adjustable mount, which provides calibrated repositioning of the part with respect to the optical profiler so that two or more surfaces can be sequentially viewed by the profiler. Also, embodiments can include single optical profiler systems in which the optical profiler provides a split field of view for simultaneously viewing different part surfaces.

Generally, the optical profiler systems can include: i) multiple (e.g., two or more) optical profilers that may or may not share common electronics and computer control; ii) a single optical profiler having multiple or composite viewing ports, with each viewing port effectively serving as an independent optical profiler; and iii) a single optical profiler adjustably positioned relative to the part or a mount supporting the part to sequentially profiler different part surfaces. The optical profiling system having multiple viewing ports may include one or more common optics, a common camera with a split field of view, and/or separate cameras. The single optical profiler system may operate by moving the optical profiler or a component thereof, or by moving the part or an adjustable mount supporting the part.

Calibration using Gage Blocks

The optical profiling systems are calibrated to determine the relative orientation and distance between the datums $H_1$, $H_2$ corresponding to the two part surface measurements. Such calibration may be necessary when, for example, the datum positions are adjusted to accommodate varying part thickness by bringing them within the profiling range η.

Figure 7:
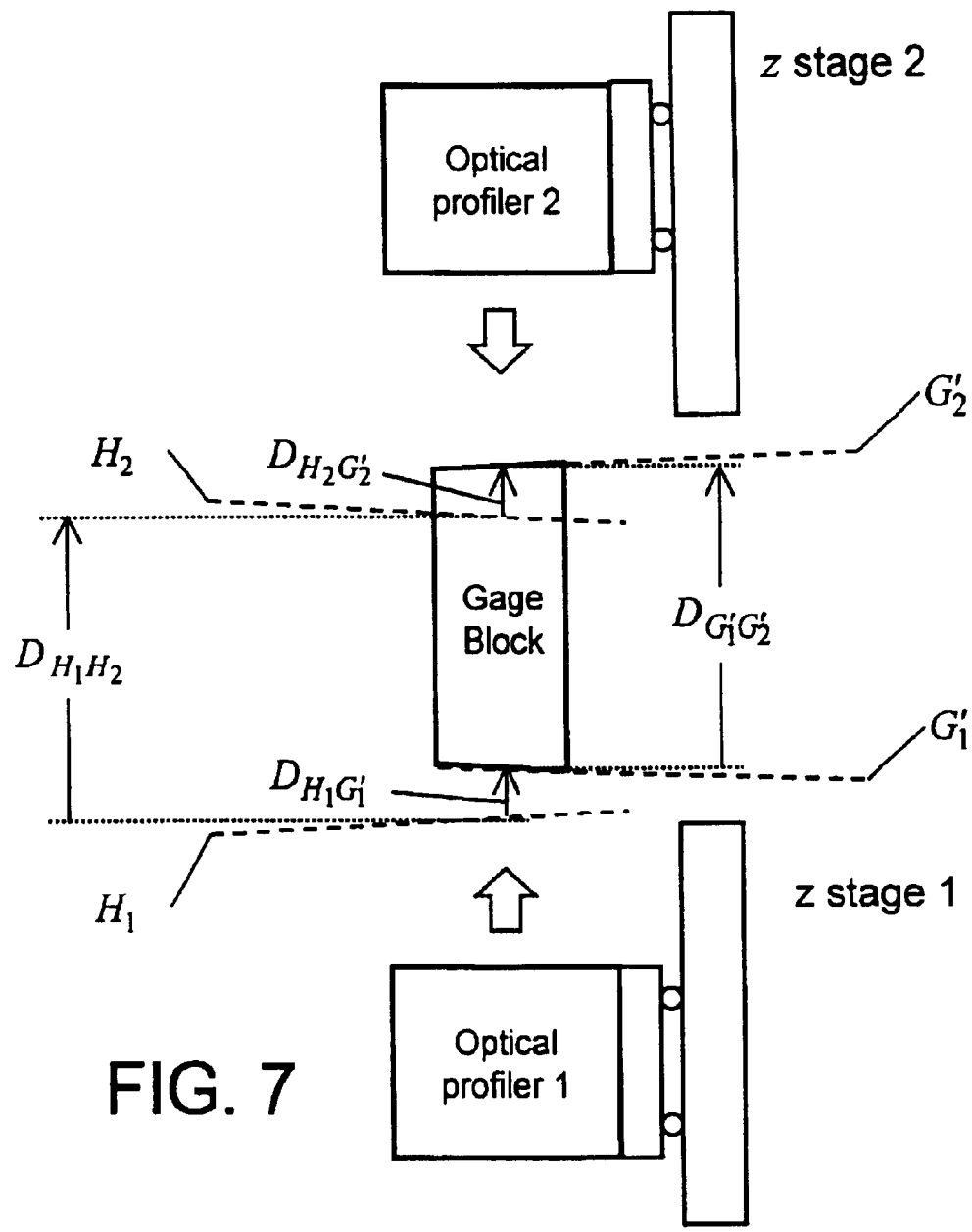
FIG. 7 is a schematic drawing of a calibration using a gage block.

One type of calibration involves standard artifacts such as certified gage blocks. The objective of the calibration is to establish the distance $D_{H_1H_2}$ and orientation angles $\alpha_{H_1H_2}$, $\beta_{H_1H_2}$ that relate the two optical profiler datum planes $H_1$, $H_2$. When using a mechanical standard artifact for calibration as shown in FIG. 7, the first step is to use the profilers to measure the lower and upper surfaces $G_1$, $G_2$. The next step is to rms fit planes $G'_1$, $G'_2$ to the profiler data, and reduce this information to distances $D_{H_1G'_1}$, $D_{H_2G'_2}$ and to orientation angles $\alpha_{H_1G'_1}$, $\beta_{H_1G'_1}$, $\alpha_{H_2G'_2}$, $\beta_{H_2G'_2}$. Knowing in advance how $G'_1$ relates to a $G'_2$ (i.e., by NIST traceable certification), we calculate $$\alpha_{H_1H_2} = \alpha_{H_1G'_1} - \alpha_{H_2G'_2} + \alpha_{G'_1G'_2} \quad (2)$$
$$\beta_{H_1H_2} = \beta_{H_1G'_1} - \beta_{H_2G'_2} + \beta_{G'_1G'_2}$$
$$D_{H_1H_2} = D_{H_1G'_1} - D_{H_2G'_2} + D_{G'_1G'_2}.$$

Once this is accomplished, measuring the part proceeds according to Eq. (1). As shown in FIG. 7, translation stages (e.g., z stages) can be used to position planes $G'_1$, $G'_2$ within profiling range $\eta$ of the optical profilers.

Figure 8:
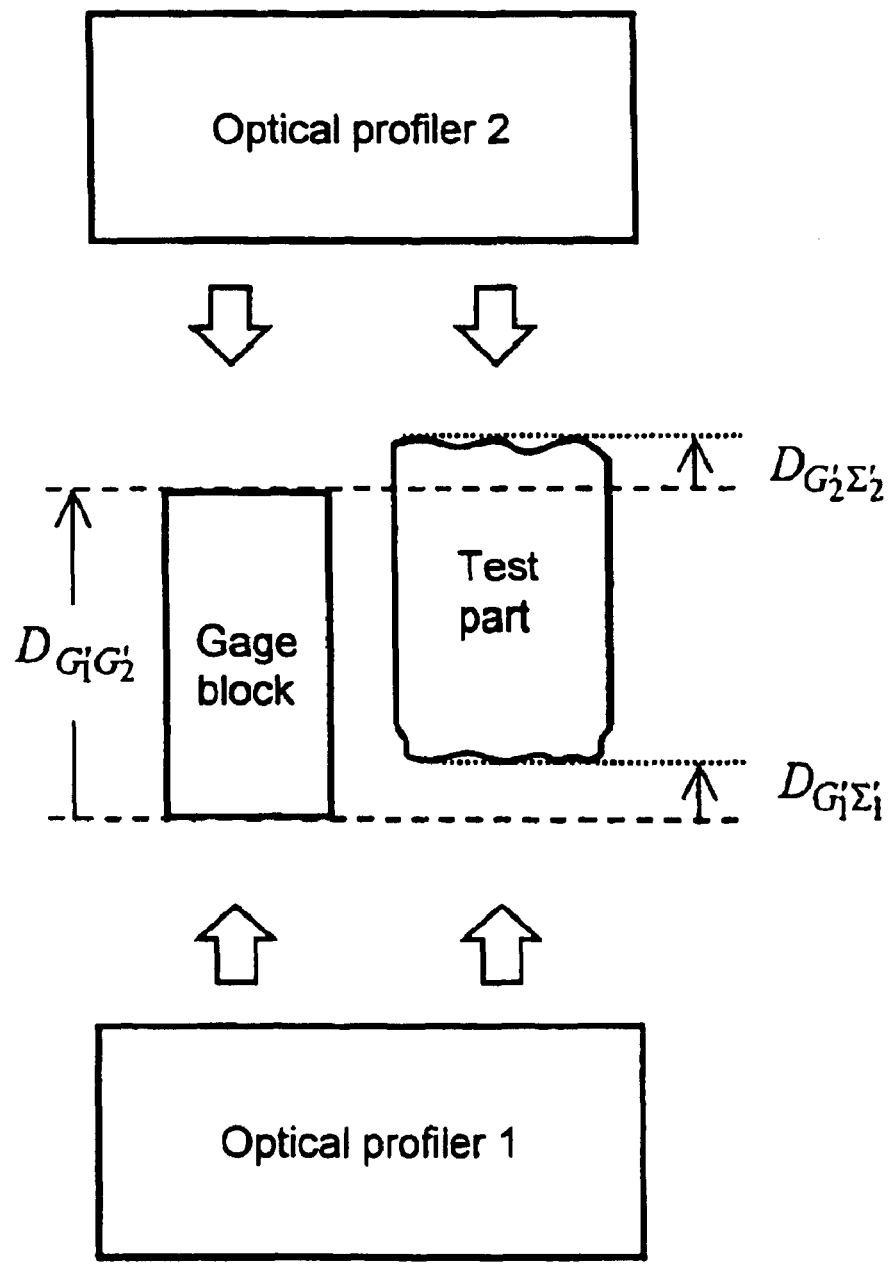
FIG. 8 is a schematic drawing of a simultaneous part measurement and system calibration using a gage block.

The foregoing calibration using a mechanical standard artifact remains valid for a length of time characteristic of the overall mechanical and thermal stability of the measurement system. For many industrial parts, the metrology tolerances for thickness are tight ($6\sigma<1$ $\mu$m) and it proves necessary to calibrate very frequently. An alternative is to place the artifact next to the test part for simultaneous calibration and part characterization in one measurement, as shown in FIG. 8. In other words, the profiling system compares a gage block directly with the test part.

A convenient data analysis procedure is to measure the step height between the gage block and the test part on each side to obtain $\alpha_{G'_1\Sigma'_1}$, $\beta_{G'_1\Sigma'_1}$, $D_{G'_1\Sigma'_1}$, $\alpha_{G'_2\Sigma'_2}$, $\beta_{G'_2\Sigma'_2}$, $D_{G'_2\Sigma'_2}$. Parallelism comes from the angles, and the thickness is the difference of the $D_{G'_1\Sigma'_1}$, $D_{G'_2\Sigma'_2}$ values plus the known or assumed characteristics of the artifact:

$$\alpha_{\Sigma'_1\Sigma'_2} = \alpha_{G'_1\Sigma'_1} - \alpha_{G'_2\Sigma'_2} + \alpha_{G'_1G'_2} \quad (3)$$
$$\beta_{\Sigma'_1\Sigma'_2} = \beta_{G'_1\Sigma'_1} - \beta_{G'_2\Sigma'_2} + \beta_{G'_1G'_2}$$
$$D_{\Sigma'_1\Sigma'_2} = D_{G'_1\Sigma'_1} - D_{G'_2\Sigma'_2} + D_{G'_1G'_2}$$

Calibration by mechanical standard artifact may be an economical way of performing FTP and other measures for repeated measurements of the same type of part. The instrument measures within a limited thickness range about the certified thickness of the artifact. A custom mechanical standard artifact is provided for each part type, designed to maximize precision and repeatability by completely surrounding the part with reference surfaces.

Calibration using a Wavelength Scale

As has been noted above, adjusting the optical profiling system for varying part thickness involves adjusting one or both of the datums $H_1$, $H_2$ to bring the object surfaces within the measurement $\eta$. Calibration determines the new relative positions and orientation of the datums $H_1$, $H_2$ after this adjustment. An alternative to using a mechanical standard artifact to recalibrate for every thickness would be to monitor any z-stage displacements and compensate for any resulting changes in tip and tilt. For example, one could use a laser-based displacement measuring interferometer (DMI) to measure stage motion as well as any other parameter related to calibration. This wavelength scale eliminates the need for maintaining multiple artifacts and should be more flexible.

Figures 9A, 9B:
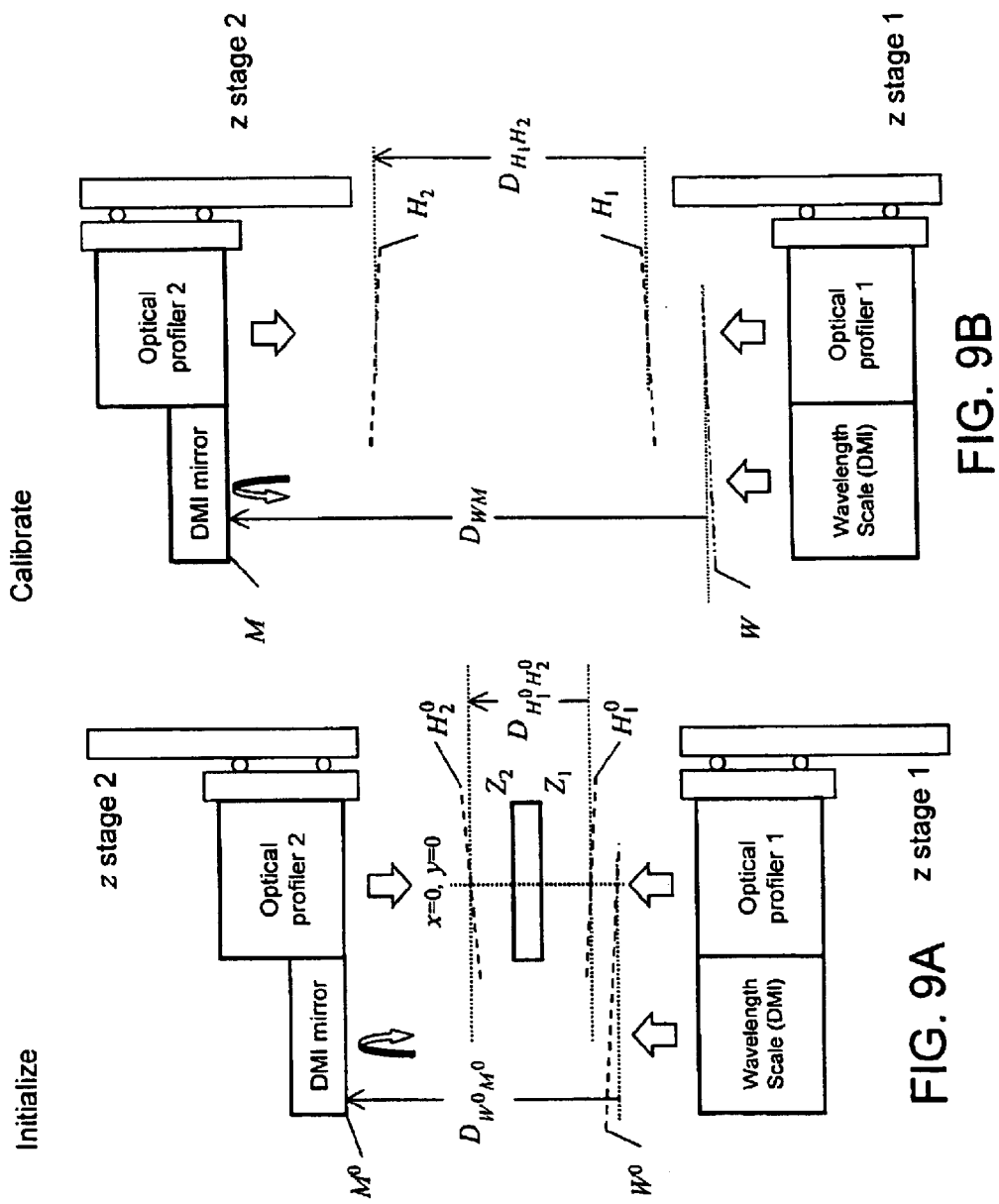
FIG. 9 is a schematic drawing of a calibration using a displacement measuring interferometer.

The DMI measurement is initialized to establish the relationship between the DMI measurement and the profiler readings. Initialization involves an initialization artifact, preferably thin, fully characterized and thermally stable, inserted temporarily into the path of the optical profilers. As the name implies, part of the function of the initialization artifact is to establish a point of origin for all thickness measurements. FIG. 9 illustrates a full calibration sequence involving an initialization (a) in which the optical profilers translate to a position from which they may measure the initialization artifact, shown here as a thin block having a known relationship between the two surfaces $Z_1$, $Z_2$. The result of the initial zeroing sequence is four angles $\alpha_{H_1^0 Z'_1}$, $\beta_{H_1^0 Z'_1}$, $\alpha_{H_2^0 Z'_2}$, $\beta_{H_2^0 Z'_2}$, and two heights $D_{H_1^0 Z'_1}$, $D_{H_2^0 Z'_2}$ resulting from the rms plane fits $Z'_1$, $Z'_2$ to height data with respect to the optical profiler datums $H_1^0$, $H_2^0$. Based on this information and knowing in advance the relationship between $Z'_1$ and $Z'_2$, the relationship between the two optical profiler datums $H_1^0$, $H_2^0$ is given by $$\alpha_{H_1^0 H_2^0} = \alpha_{H_1^0 Z'_1} - \alpha_{H_2^0 Z'_2} + \alpha_{Z'_1 Z'_2} \quad (4)$$
$$\beta_{H_1^0 H_2^0} = \beta_{H_1^0 Z'_1} - \beta_{H_2^0 Z'_2} + \beta_{Z'_1 Z'_2}$$
$$D_{H_1^0 H_2^0} = D_{H_1^0 Z'_1} - D_{H_2^0 Z'_2} + D_{Z'_1 Z'_2}.$$

At the same time, the DMI provides the angles $\alpha_{W^0M^0}$, $\beta_{W^0M^0}$ and heights $D_{W^0M^0}$ resulting from a measurement of the initial relative position and orientation of the DMI mirror $M^0$ attached to profiler 2 with respect to the DMI internal reference datum $W^0$. This completes the initialization process.

Now we can translate the optical profiler to any other position and thanks to the DMI, know precisely how far we have moved (see FIG. 9, step (b)). The following equations calibrate the instrument for new positions:

$$\alpha_{H_1 H_2} = \alpha_{H_1^0 H_2^0} + \alpha_{WM} - \alpha_{W^0M^0} \quad (5)$$
$$\beta_{H_1 H_2} = \beta_{H_1^0 H_2^0} + \beta_{WM} - \beta_{W^0M^0}$$
$$D_{H_1 H_2} = D_{H_1^0 H_2^0} - D_{WM} - D_{W^0M^0}$$

where $\alpha_{WM}$, $\beta_{WM}$, $D_{WM}$ are DMI angles and heights measured for the new stage positions.

An underlying assumption in this calculation is that the relationship between the DMI internal reference datum W and the optical profiler datum $H_1$ is always the same. Further, the relationship between the DMI mirror M and the optical profiler datum $H_2$ is also assumed to be constant. Mechanical and thermal drift may compromise this assumption over time, necessitating re-initialization.

These calculations assume that the coordinate system for both the DMI and the optical profilers are the same, in particular, the x,y=0,0 lateral origin along which all of the distance measurements "D" are taken. Thus minimizing Abbé offset errors would entail positioning the DMI beams so that the angles $\alpha_{WM}$, $\beta_{WM}$ have the smallest possible impact on calculating $D_{WM}$.

There are several embodiments for wavelength scale initialization. For example, the initialization artifact could be transparent, with one surface partially reflective. In this case, the two surfaces $Z_1$, $Z_2$ would be opposite sides of the same surface, and the angles $\alpha_{Z'_1 Z'_2}$, $\beta_{Z'_1 Z'_2}$ and distance $D_{Z'_1 Z'_2}$ would be very nearly equal to zero. A partially transparent zero-pane artifact could conceivably remain in the field of view at all times and be a permanent fixture in the system.

An additional calibration task can include subtraction of wavefront system errors that can degrade the flatness metrology. For example, a reference flat of very high quality can be inserted into the instrument to determine wavefront system errors, which are stored and used to correct the error in subsequent measurements. Measurement of system errors can take place simultaneously with initialization, e.g. if this reference flat is identical to the initialization artifact.

Several types of laser interferometer satisfy the minimum requirements for the DMI necessary for the wavelength scale calibration. For example, although three DMI beams or axes are normally necessary for distance and orientation, two or even one axis with some other mechanism to control angle may be sufficient. At the other extreme, the DMI may be a laser Fizeau interferometer, providing thousands of distance measurements. In this case, the DMI might be integrated into the optical profilers directly and share the same imaging system.

In one embodiment, a laser-based interferometer working in parallel with the optical profiler can be used, such as a 3.39 μm Jodon HeNe integrated into an IR Scanning system operating at 3.5–5.0 μm. The HeNe laser in the IR is naturally stable wavelength and mode stable, and all of the optics are shared by the wavelength scale and the optical profiler. IR cameras operating in this wavelength band may require low-MTBF Stirling cycle coolers. Alternatively, sources in the range of 8–12 μm can be used in the IR Scanning system because of the high reliability of commercial microbolometers. Such a source includes a 10.6-μm $CO_2$ laser. Alternatively, a multiple wavelength $CO_2$ laser interferometry can be used as the wavelength scale. Such an instrument would measure absolute height over a much larger range η, potentially covering the entire anticipated range of part thickness (e.g. 0–75 mm).

Another appropriate wavelength scale is a commercial 0.63-μm HeNe heterodyne DMI, such as a ZMI 510 from Zygo Corp. (Middletown, Conn.).

Complex Features and Structured Datums

Figure 10:
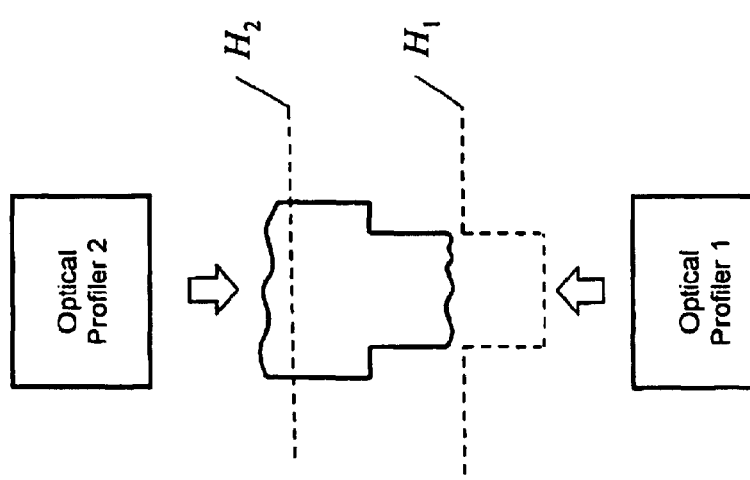
FIG. 10 is a schematic drawing of a structured optical profiler datum for use in measuring a step height.

Some part types have somewhat more complex features than two opposing surfaces. For example, FIG. 10 shows a part having three parallel surfaces, one upper surface and two offset lower surfaces. In addition to the thickness measurement, which relates to opposing surfaces, there is therefore a step height measurement. If the step height exceeds the measurement range η of the optical profiler, this presents a problem. As described above, this provides motivation for FPH-type measurements where each of the two offset lower surfaces are profiled in respective coordinate systems, and the coordinate systems are related to one another to determine the step height.

Alternatively, one can provide a structured optical profiler datum for the optical profiler. For example, this can be accomplished in interferometric optical profiler by positioning an object having a structured lateral profile in the reference arm of the optical profiler, e.g., the profiler could have a structured reference mirror. For the case illustrated in FIG. 10, the structured optical profiler datum comprises two parallel planes having a nominal offset equivalent to that of the step height. The offset between the parallel planes in the structured profiler datum may be calibrated by a procedure similar to that described above, or may be a stable, known internal characteristic of the optical profiler. An optical profiler of this kind is capable of flatness, step height and parallelism measurement from one side, and flatness step height, thickness and parallelism from two sides.

Figure 11:
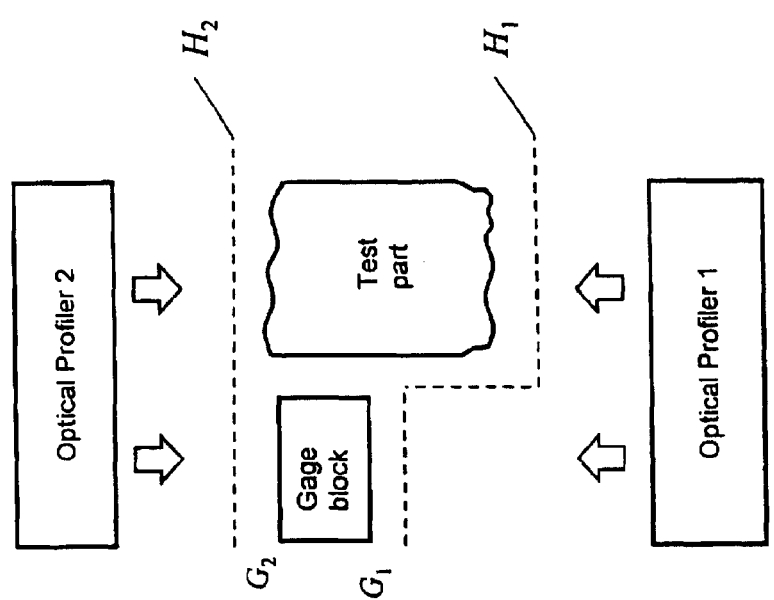
FIG. 11 is a schematic drawing of a structured optical profiler datum for use in calibration.

Another potential use of a structured profiler datum is to simplify calibration. FIG. 11 shows how a small gage block may be employed to calibrate the system for measuring a larger test part, assuming that the structured profiler datum has a known offset. This type of calibration essentially transfers the calibration burden to the optical profiler itself. This could be advantageous if, for example, the optical profiler were configured to provide a variety of calibrated structured profiler datums without requiring the additional calibration steps described above.

Figure 12:
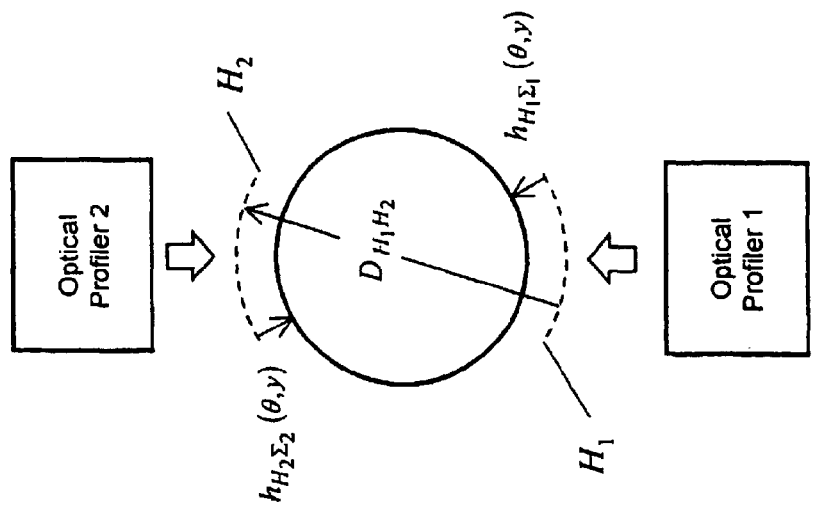
FIG. 12 is a schematic drawing of a structured optical profiler datum for measuring the relationship between curved surfaces.

Another example illustrates how a structured datum extends the underlying concepts of FTP measurement to non-planar surface, e.g., the form, diameter, roundness, and/or straightness of spherical or cylindrical objects. FIG. 12 illustrates conceptually how measurements from a curved optical profiler datum provide straightness, diameter and roundness of a cylinder. Preferably, in this case, a turntable would rotate and perhaps translate the part so as to complete the measurement over the entire surface.

FPH Optical Profiling System

Figure 13:
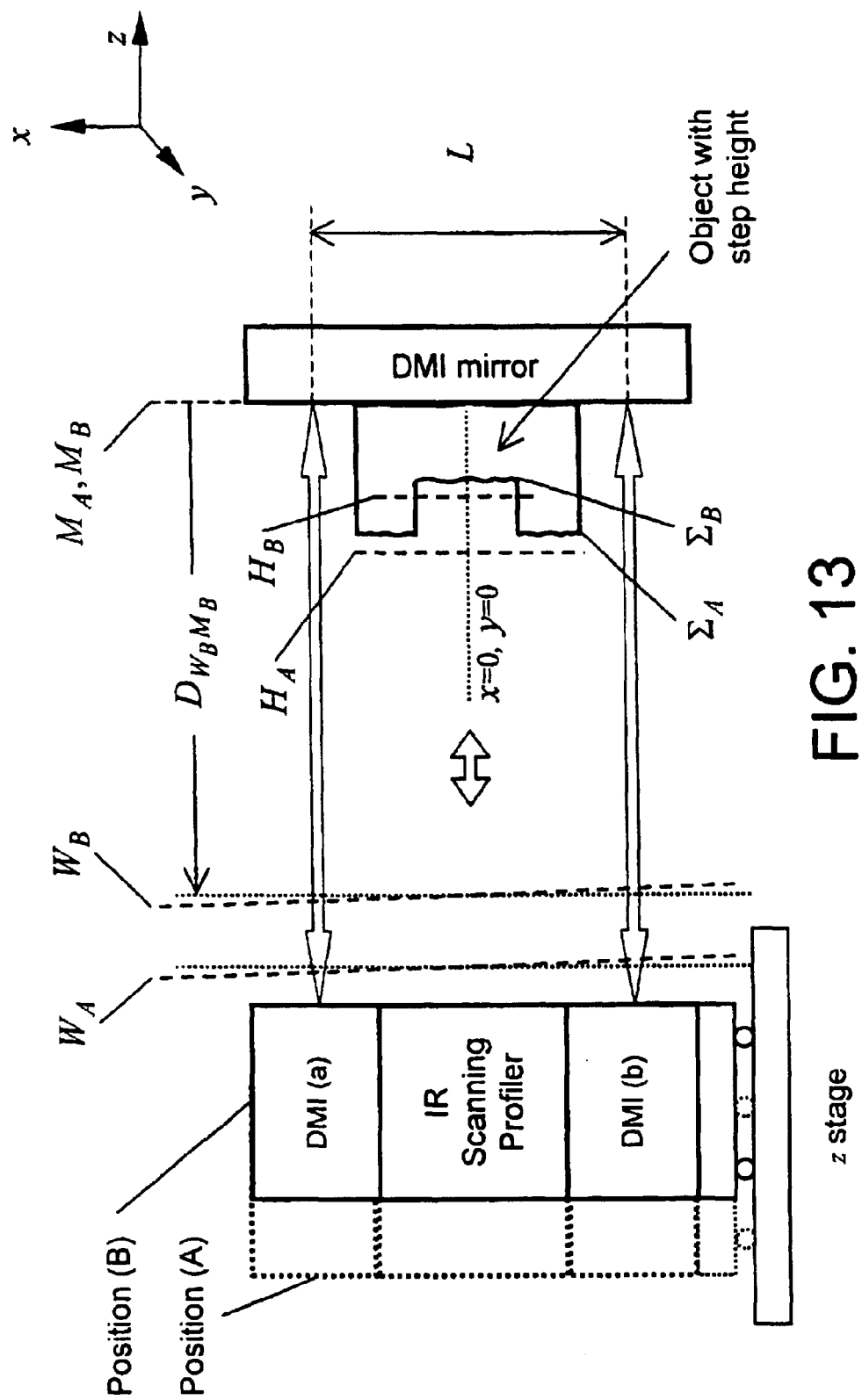
FIG. 13 is a schematic drawing of a optical profiling system from measuring step-height.

FIG. 13 is schematic drawing for directly measuring step height. The system is a single-sided step-height-measuring tool (e.g, an FPH tool) employing a DMI as a wavelength scale. An IR Scanning optical profiler (discussed in more detail further below) measures a height $h_{H\Sigma}$ for any given point x,y on a surface Σ with respect to an optical profiler datum H. A translation of the optical profiler (i.e., a z-stage translation) provides an "extended scan" to capture both surfaces $\Sigma_A$, $\Sigma_B$ when the step height exceeds the range η, the orientation and position of the optical profiler datum H changes between the two positions A and B. If we know the relationship between the two corresponding optical profiler datums $H_A$, $H_B$, then we have a means of measuring step height. The role of the ZMI, therefore, is to relate $H_B$ to $H_A$.

Knowing the relationship between the optical profiler datum planes $H_A$, $H_B$ for the two positions A and B, we can reference both surface profiles to a common plane, e.g. $H_A$:

$$h_{H_A\Sigma_B}(x,y)=h_{H_B\Sigma_B}(x,y)+D_{H_AH_B}+x\tan(\alpha_{H_AH_B})+y\tan(\beta_{H_AH_B}). \quad (6)$$

Here $D_{H_AH_B}$ the distance from $H_A$ to $H_B$ at x=0, y=0, and $\alpha_{H_AH_B}, \beta_{H_AH_B}$ are the tip and tilt angles between these two planes. Knowing $h_{H_A\Sigma_A}$ and $h_{H_A\Sigma_B}$ for all x,y provides all the information necessary for FP-H measurements. In the system of FIG. 10, the test part is attached to DMI mirror M, either directly or by mechanical fixturing, to thereby maintain a rigid relationship between the part and the mirror. Thus in this embodiment, the DMI directly monitors the position of the optical profiler with respect to the part. The DMI data for beams a and b condenses to distances D and angles α,β according to the following formulas:

$$\alpha_{WM} = \arctan[(w^a_{WM} - w^b_{WM})/L] \quad (7)$$

$$\beta_{WM} = \text{const}$$

$$D_{WM} = (w^a_{WM} + w^b_{WM})/2.$$

where $W^a{}_{WM}$, $W^b{}_{WM}$ refer to the distances measured by the two ZMI beams a,b as shown in FIG. 13, and L is the lateral separation of these beams. Note that because there are only two DMI beams, the β or "tip" angle is assumed constant and is not tracked. The relative orientation and separation for the two optical datum plane positions A and B is then $$\alpha_{H_AH_B} = \alpha_{W_BM_B} - \alpha_{W_AM_A} \quad (8)$$

$$\beta_{H_AH_B} = 0$$

$$D_{H_AH_B} = D_{W_BM_B} - D_{W_AM_A}.$$

In practice, it makes sense to set to zero both $W^a{}_{W_AM_A}$ and $W^b{}_{W_AM_A}$ as a standard procedure, in which case $\alpha_{W_AM_A}=0$ and $D_{W_AM_A}=0$, thus further simplifying Eq. (8).

Figure 14:
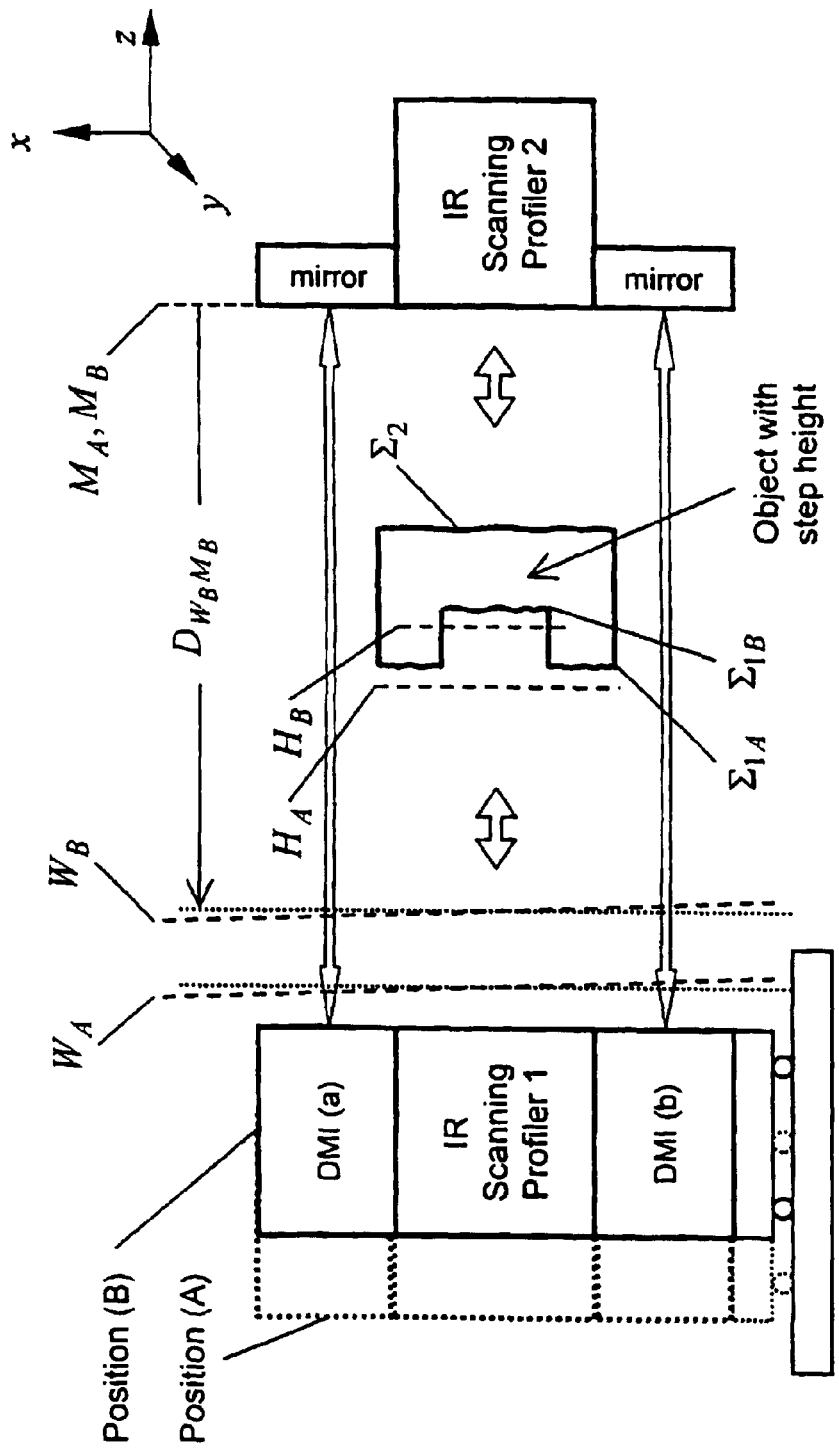
FIG. 14 is a schematic drawing of a optical profiling system from measuring step-height and thickness.

FIG. 14 is a schematic diagram of an optical profiling system capable of both FTP and FPH measurements. In this embodiment, the DMI mirror is a virtual construct, resulting from reflections from several fold mirrors in the system (those attached to IR Scanning Profiler 2), none of which are actually attached to the part or the part fixture. Therefore, the DMI readings in this embodiment are only sensitive to the apparent or effective separation between the two optical profilers, as is required for thickness measurement, and do not report the actual part position.

Although the system of FIG. 14 has a different geometry than that of FIG. 13, it is still possible to measure step height according to an alternative extended-scan procedure. Here, the system performs two successive FTP measurements with a z stage motion in between. The part in this case, shown in FIG. 14 has a back surface $\Sigma_2$ nominally parallel to the surface regions $\Sigma_{1A}$, $\Sigma_{1B}$, or a mounting fixture having a mirror that serves as a substitute back surface. The step-height measurement proceeds as follows. First, we obtain a height profile $h_{\Sigma'_2,\Sigma_{1A}}$ of surface region $\Sigma_{1A}$ with respect to an rms plane fit $\Sigma'_2$ to the back surface $\Sigma_2$, using FTP functions. Then we repeat the procedure for $\Sigma_{1B}$ with respect to $\Sigma'_2$. The two surface regions $\Sigma_{1A}$, $\Sigma_{1B}$ are now related to a common reference plane $\Sigma'_2$, as required for step height analysis.

Angled Surfaces

Figure 15:
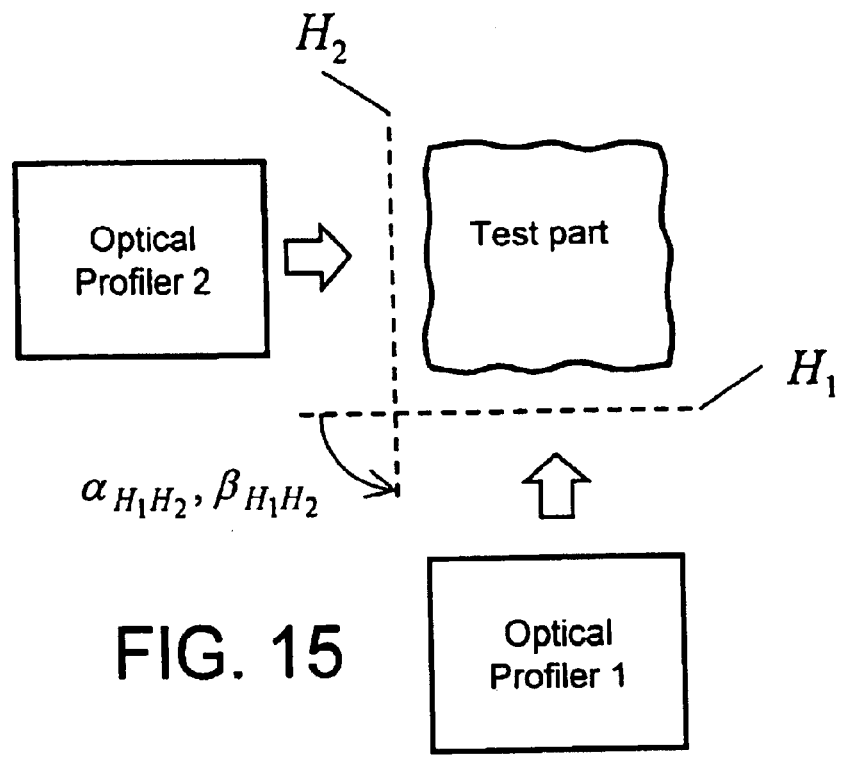
FIG. 15 is a schematic drawing of an optical profiling system measuring flatness and perpendicularity.
Figure 16:
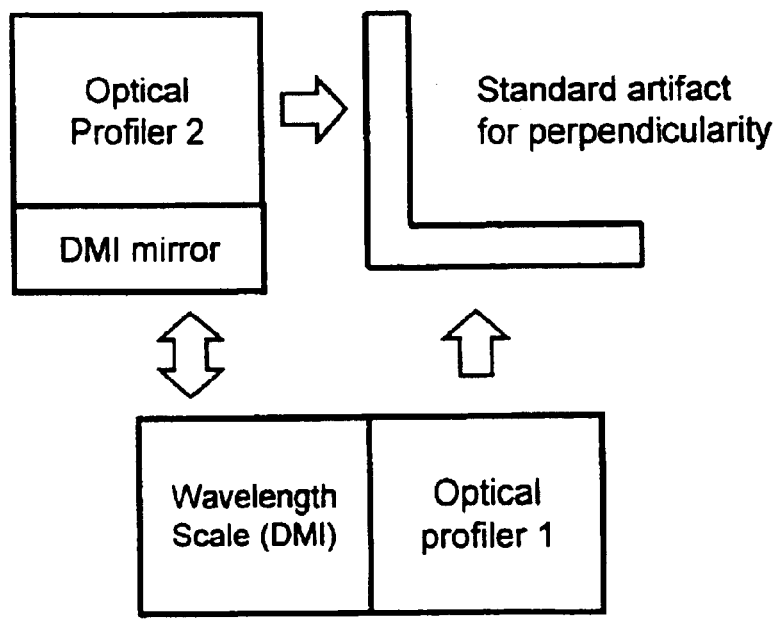
FIG. 16 is a schematic drawing of a calibration of the optical profiling system of FIG. 15.

The FTP optical metrology concepts readily translate to other types of relational measurements between surfaces, including those that are not nominally parallel. FIG. 15 illustrates a measurement of flatness and perpendicularity of two surfaces. For this type of measurement, thickness is not a relevant parameter; however the calibration procedures are similar to what has been discussed above. FIG. 16 shows calibration by a standard artifact and a DMI monitoring system, either of which can be used for the calibration. Furthermore, the artifact could be a partially-transparent element, in which case, it could be permanently in the field of view.

Figure 17:
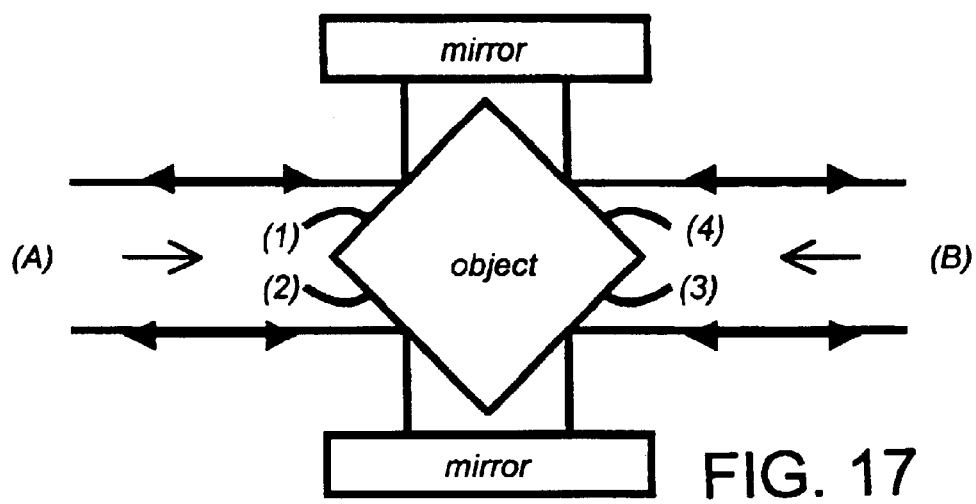
FIG. 17 is a schematic drawing of an optical profiling geometry measuring flatness. thickness, perpendicularity, and orthogonality (FTPO).

Additional embodiments can combine FTP and angle measurements, e.g., flatness, thickness, parallelism, and orthogonality (FTPO). For example, FIG. 17 illustrates a potential geometry for simultaneously measuring four surfaces, labeled (1) through (4), of an object having a rectangular cross section. The basic FTP instrument illuminates the object from two directions, labeled (A) and (B). The objective is to measure the flatness of all surfaces the thickness and parallelism of surface (1) with respect to (3) as well as surface (2) with respect to (4), and the orthogonality of all adjacent surfaces.

In FIG. 17, the two mirrors (orthogonality-test mirrors) are fixtured to be plane parallel and have a known separation, thus, the measurement geometry converts all 90-degree reflections into 180-degree reversals. This conversion transforms all of the angle measurements into simple parallelism checks. Thus if surface (1) is orthogonal to surface (4), they will appear to be parallel in the instrument. This is true even if either the object or the orthogonality-test mirror pair is rotated about an axis perpendicular to FIG. 17.

Figure 18:
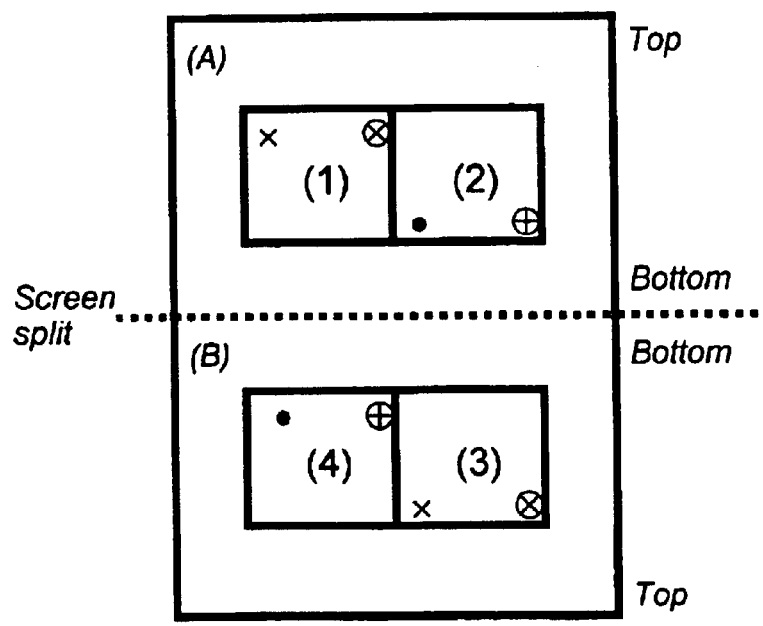
FIG. 18 is a schematic drawing of the camera image for the geometry of FIG. 15.

FIG. 18 illustrates the appearance of the part as viewed by a camera imaging the system of FIG. 17. The symbols x, ⓧ, ●, and ⊕, mark corresponding surface points on opposite sides of the object. For example, an LMC calculation of minimum thickness between surfaces (1) and (3) would involve the distance from the points marked with an x on each of these surfaces. Also, the origin or zero-thickness position is shifted by an amount L in the negative direction, equal in magnitude to the separation of the two orthogonality-test mirrors. Furthermore, A thickness D between any two surfaces is magnified in the geometry by $\sqrt{2}$, because of the double-pass reflection at a 45° angle of incidence.

Figure 19:
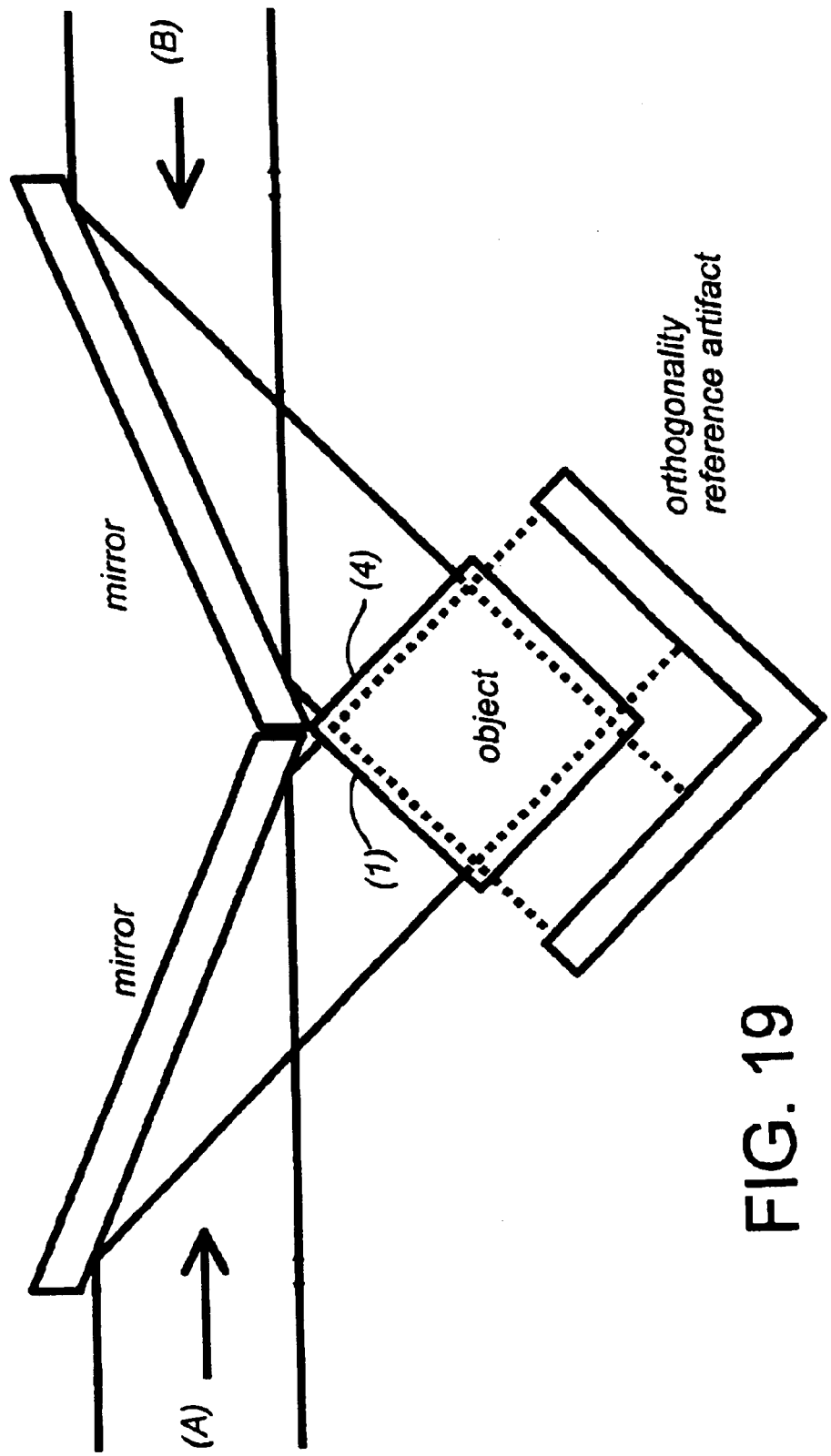
FIG. 19 is a schematic drawing of a profiling system measuring orthogonality.

Another arrangement is shown in FIG. 19, which tests the orthogonality of adjacent surfaces. This arrangement includes an additional orthogonality artifact to reference an initialization position. Like the system in FIG. 17, the mirrors convert the orthogonality measurement into a parallelism measurement.

Figure 20:
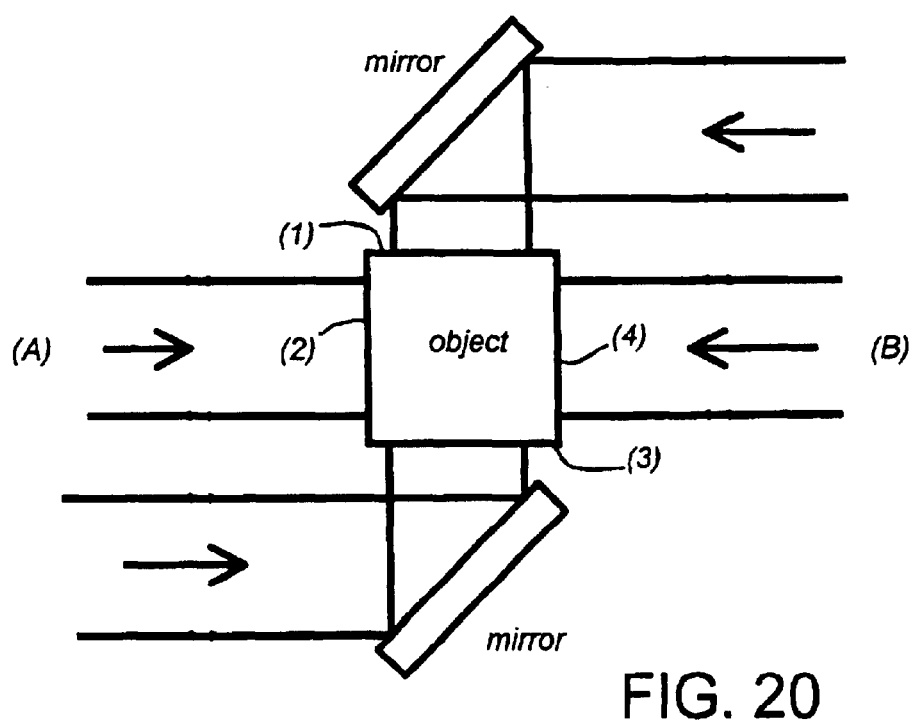
FIG. 20 is a schematic drawing of an FTPO profiling system.

Yet another arrangement is shown in FIG. 20, which tests all of FTPO. Here each of two perpendicular mirrors split the field of view from one of two optical profilers to accommodate profiling of four sides of a rectangular test part. The FTPO system of FIG. 20 also includes a structured reference or employs a z-stage motion to accommodate for the fact that the distances to surfaces (1) and (3) are not the same as those to surfaces (2) and (4), respectively.

Optical Profilers

For relational measurements such as FTP, FTPO, and FPH, the optical profiler measures absolute surface height with respect to an optical profiler datum plane over at least a restricted measurement range η. Suitable optical profilers include triangulation systems, which involve geometric interpretation of position using trigonometry and assuming linear light propagation, time of flight systems, which utilize light pulse or amplitude modulation to associate time delay with distance, multiple wavelength interferometers, which use a sequence of discrete wavelengths followed by fractional fringe or synthetic wavelength analysis, phase-shifting interferometers, and height scanning interferometers. For many applications, the optical profilers are preferably height scanning interferometers. which include scanning white light interferometers (SWLI), scanning MESA interferometers, scanning grazing incidence interferometers, and IR scanning interferometers.

SWLI is described, for example, in commonly owed U.S. Pat. Nos. 5,398,113 and 5,402,234, the contents of which are incorporated herein by reference. The NewView 5000 from Zygo Corp. (Middlefield Conn.) is a commercially available, SWLI instrument, which is capable of absolute height measurement. When a SWLI instrument is used on a part with a surface rough compared to the visible wavelength of the SWLI source, speckle phenomena degrade the meaningfulness of conventional interferometric fringe patterns. The white light coherence peak, however, can still provide distance information. See, e.g., T. Dresel, G. Haeusler, and H. Venzke in "Three-dimensional sensing of rough surfaces by coherance radar," *Appl. Opt.* 31(7), 919–925 (1992).

Scanning MESA interferometers are described in commonly owed U.S. Pat. No. 5,598,265, the contents of which are incorporated herein by reference. Scanning grazing incidence interferometers are described in commonly owed, U.S. patent application Ser. No. 09/325,175 entitled "Grazing Incidence Interferometer and Method" filed Jun. 3, 1999, the contents of which are incorporated herein by reference.

IR scanning interferometers are like SWLI instruments except that broadband infrared light is used rather than white light. Surfaces that appear rough and generate speckle at visible wavelengths take on an entirely different appearance at longer wavelengths, e.g. in the IR. Thus, the IR scanning interferometer utilizes IR wavelengths sufficiently large so as to eliminate the troublesome speckle phenomena that are characteristic of rough-surface white light interferometry. The image and the interference fringes are therefore free of speckle and of all of the attending limitations and difficulties. By means of a broadband source to localize fringes, a suitable scanning mechanism and computer control, we achieve unambiguous measurement of technical surface profiles as well as relationships between surfaces and points over large areas, with high accuracy and rapid measurement speed. IR scanning interferometry systems are described in commonly owed U.S. utility patent application Ser. No. 09/514,215, filed Feb. 25, 2000.

Figure 21:
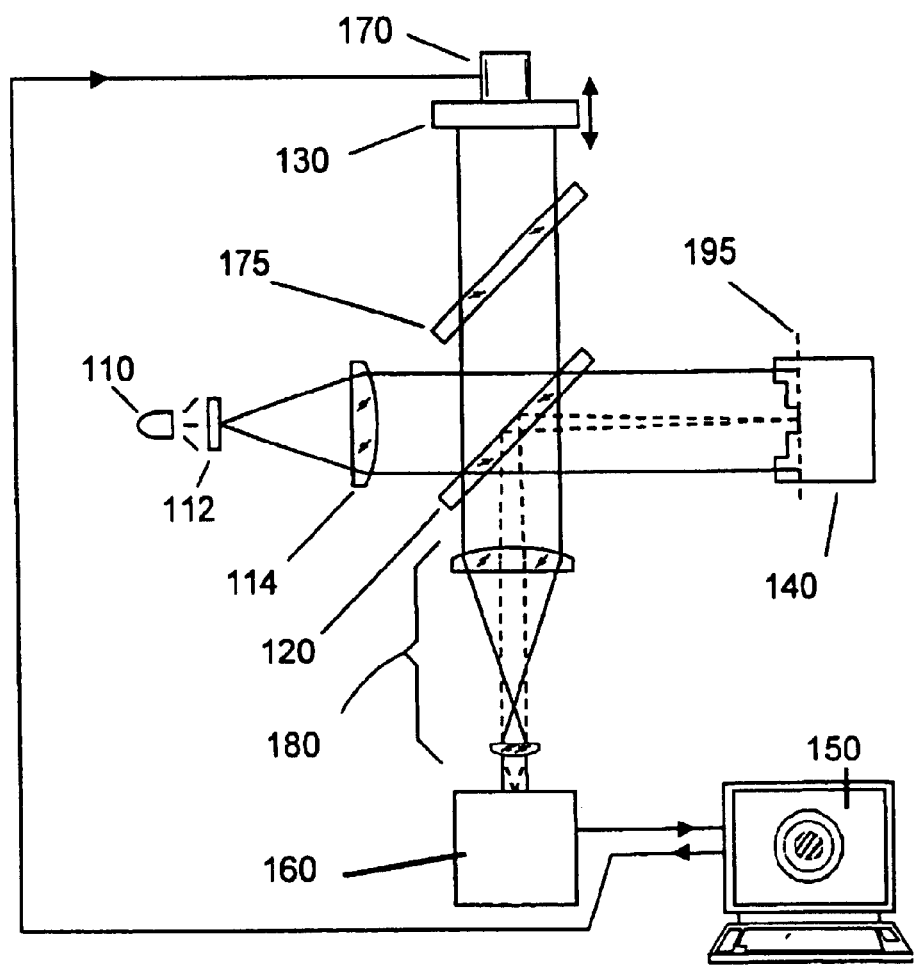
FIG. 21 is a schematic diagram of an infrared scanning height measuring interferometer.

As shown in FIG. 21, an IR scanning interferometer typically includes: i) a broadband source providing a range of IR wavelengths for which the technical surfaces of the object appear specular, i.e., the reflected light at normal incidence is free of speckle; ii) an interferometric optical system, including at least one measurement beam reflecting from at least one object surface or surface point; iii) means for scanning the optical path difference of the interferometer (e.g., PZT-actuated reference mirror) while collecting interference data with an IR camera; and iii) computer control and processing for interpreting the interference data, so as to profile selected technical surfaces, and/or to determine parallelism, thickness and/or height separation of multiple surfaces without fringe ambiguity.

FIG. 21 illustrates an embodiment of the invention based on a Michelson-type interferometer 100 but operating entirely in the IR, at a wavelength sufficiently long such that the object technical surfaces within the field of view appear specular, e.g. 1 to 20 $\mu$m. The IR source 110 is sufficiently broadband to provide a limited coherence range, e.g. a few tens of $\mu$m. A diffuser 112 and a collimating lens 114 are positioned between the source and a beam splitter 120. The beam splitter directs a first portion of the broadband radiation along a reference leg to a reference mirror 130, and a second portion along a measurement leg to a measurement object 140. Imaging optics 180 direct the radiation recombined by the beam splitter to an IR camera 160. A computer 150 collects interference data from IR camera 160 while varying the optical path difference between the measurement and reference legs by means of a piezoelectric transducer (PZT) 170 attached to reference mirror 130. The effect of the PZT scan is to scan the measurement plane horizontally (e.g., with reference to measurement plane 195). The resulting interference data produces a localization of fringe data around the zero optical-path difference (OPD) position, which is characteristic of interferometry with a broadband source. The fringe localization provides a means of determining the precise moment when the measurement plane intersects the object point corresponding to the image pixel. The PZT motion is precisely controlled, so that knowledge of when a given object point is at zero OPD can be directly translated into a local surface height that is free of the ambiguity normally associated with interferometry. A compensator plate 175 compensates for dispersion caused by the beam splitter.

One may apply any of a variety of techniques for determining surface height using localized fringes. For example, one approach is to determine the scan position of peak fringe contrast. Suppose, for example, that interference data for a first pixel produced peak fringe contrast at a scan position of 0 $\mu$m. A second pixel might have a peak fringe contrast at a different scan position, for example 10 $\mu$m. Thus, the absolute height difference between the two object points corresponding to these image pixels would therefore be 10 $\mu$m.

Because technical surfaces appear smooth in the IR scanning interferometer, it is meaningful to interpolate the interference phase for high accuracy, in a way that is not possible with prior-art, rough-surface white-light interferometry. Thus once the basic dimensions have been determined using fringe contrast, one may obtain a higher precision by means of the interference phase free of fringe ambiguity. Alternatively, one may process the data entirely in terms of broadband interference phases, using the frequency-domain analysis procedure disclosed in commonly owned U.S. Pat. No. 5,398,113.

Many other embodiments of the IR scanning interferometer are possible. For example, the interferometer may be a Twyman-Green capable of profiling lenses, non-flat surfaces and optical components in the grinding phase of fabrication. Another variant is a Fizeau-type interferometer, with a comb-spectrum source providing periodic coherence peaks. Another variant uses a Mirau-type interference microscope objective. The source can be any broadband source operating in the infrared, e.g., a source operating in the range of about 1 micron to 20 microns, or more particularly, for example, 3 to 10 microns. The coherence length of the broadband IR source can be, e.g., in the range of about 10 to 50 microns. Suitable sources include a naked filament, a halogen bulb, a chemical source, a multimode $CO_2$ laser, other lasers such as diode lasers operating in the infrared, infrared LEDs, etc. The detector can be any detector suitable for measuring the IR radiation, e.g., a pixellated microbolometer such as an InSb array.

FTP System for Transparent Test Objects

Figure 22:
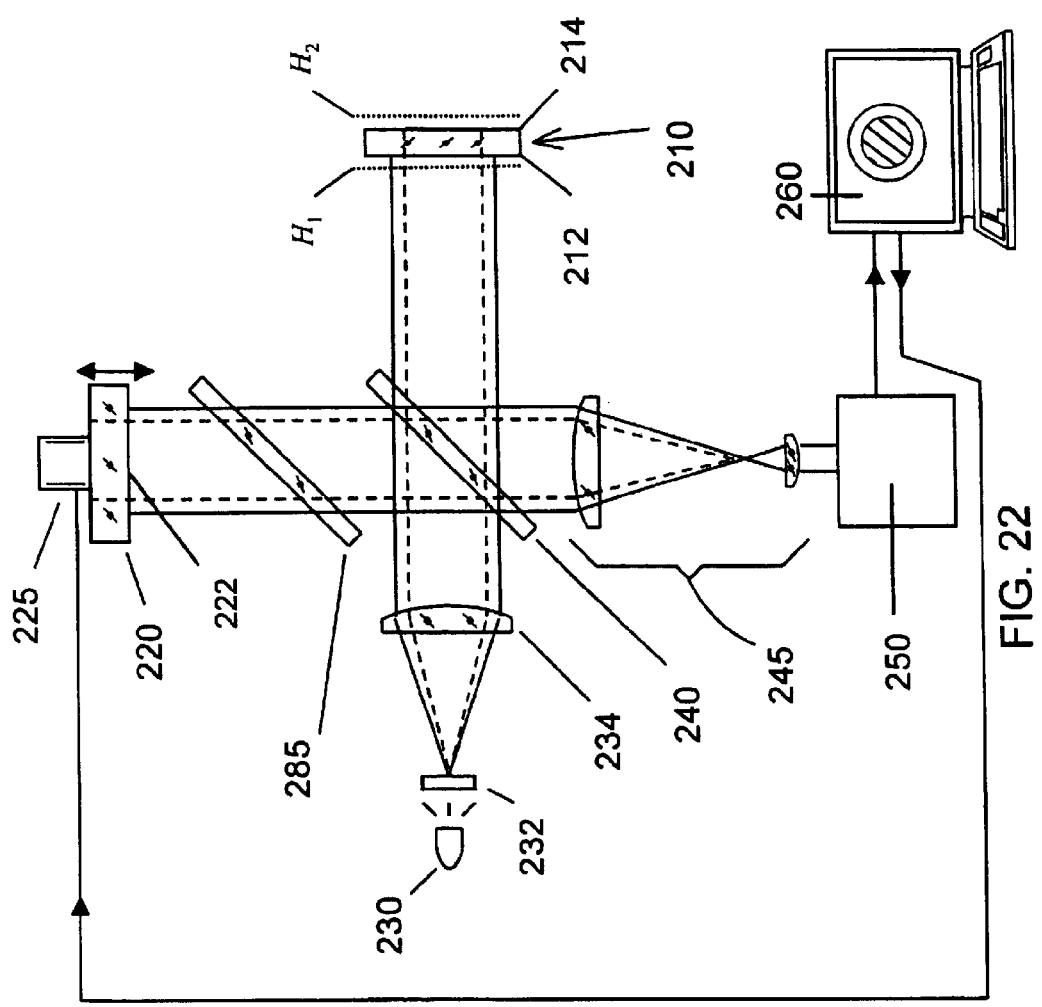
FIG. 22 is a schematic diagram of an FTP optical profiling system for measuring a partially transparent test part.

An optical profiling system 200 for measuring a geometric property (e.g., FTP) of a partially transparent test part 210 is shown in FIG. 22. Because test part 210 is partially transparent, surface profile measurements of both its front and back surfaces (212 and 214, respectively) can be made by using a scanning interferometer that includes a partially transparent reference mirror 220. Reference mirror 220 includes a partially reflective, first surface 222, which defines a first optical datum plane $H_1$ near front surface 212 of test part 210, and a second surface 224, which defines a second optical datum plane $H_2$ near back surface 214 of test part 210.

The other components of system 200 are similar to those in FIG. 21, except that the system can operate at any wavelength (e.g., the ultraviolet (UV), visible, near-infrared (NIR), and infrared (IR)). Source 230 provides broadband radiation that passes through a diffuser 232 and a collimator 234. The collimated radiation is split by a beam splitter 240 to define a reference leg where a reference portion of the radiation is directed to reference mirror 220, and a measurement leg where a measurement portion of the radiation is directed to test part 210. Beam splitter 240 then recombines radiation reflected by reference mirror 220 and test part 210 to produce an interferogram, which is focused by imaging optics 245 onto a camera 250. Camera 250 records the interferometric data and sends it to computer 260 for analysis. Reference mirror 220 is mounted on a scanning mechanism 225 (such as a piezoelectric transducer or motorized stage) coupled to computer 260. During operation computer 260 causes the scanning mechanism to adjust the position of the reference mirror and store the interferometric data as a function of the scan position. Also, a compensator plate 283 is positioned in the reference leg to compensate for dispersion caused by the beam splitter.

The optical datum planes $H_1$ and $H_2$ are specified for an initial starting position for reference mirror 220. As scanning mechanism 225 (e.g., a PZT) adjusts the position of reference mirror 220 over a scanning range η, the zero OPD (optical path length difference) planes corresponding to surfaces 221 and 222 of the reference mirror are scanned from the position of datum planes $H_1$ and $H_2$. When either zero-OPD plane intersects a surface feature of the test part during the scan, the interference from the broadband radiation is optimized (i.e., we have a coherence peak in the interferometric data). In practice, the interference data corresponding to the front and back surfaces of the test part can be distinguished from one another when the separation between the surfaces of the test object differs from the separation between the surfaces of the reference mirror by greater than the coherence length of the broadband source. Accordingly, the system may include multiple partially reflective reference mirrors, each of which can be attached to, and detached from, the scanning mechanism to accommodate different test part thickness.

Thus, front surface 211 of the test part is profiled relative to datum plane $H_1$ and back surface 212 of the test part is profiled relative to datum plane $H_2$. The relationship between the two datum surfaces is defined by the optical separation of surfaces 221 and 222 of the reference mirror. By calibrating the reference mirror, computer 260 can store the relationship between the datum planes and calculate FTP and other geometric properties for transparent test object 210 based on the profiled surfaces and the relationship. Such calculations are similar to those described above for other embodiments, however, one needs to account for optical path length within the transparent reference mirror and test object, which will be optically more dense than the surrounding air or gas.

Because each surface of the reference mirror defines an optical datum plane, optical profiling system 200 can be thought of as having two optical profilers that monitor substantially parallel surfaces of a test object from the same side. Accordingly it is clear that optical profiling system 200 can also be used for FPH measurements (e.g., step-height measurements) of a non-transparent test object, with the surfaces of the reference mirror providing datum surfaces for profiling the surfaces of the test part that define the step-height.

To calibrate the separation between the surfaces of the reference mirror and determine the relationship between optical datum planes $H_1$ and $H_2$, one can replace test object 210 with a partially transparent calibration object having a predetermined thickness. The calibration follows analogously to that described earlier involving gage blocks. Moreover, as with previously described embodiments, the partially transparent calibration object can remain in the field of view during measurements of the test part to provide online data for the calibration. Alternatively, the thickness of the reference mirror can be precalibrated prior to its incorporation into optical profiling system 200. For example, the reference mirror may be a "master" to which the other test objects are being compared. The thickness of the master may be measured, e.g., by a careful physical thickness measurement, which is then multiplied by its refractive index to obtain its optical thickness. Alternatively, the master may be qualified by its functional properties only, and the quantity of interest is absolute FTP measurements with respect to the master, without concern for the precise actual thickness of the master itself.

We note that the measurements here presume that the nominal thickness of the test part (or the step height) is greater than the scanning range η. If this were not the case, a conventional scanning interferometer (i.e., one having only one reflective surface in the reference leg) could directly measure the front and back surfaces (or step-height surfaces) with respect to a single datum plane.

Generally, the surface profiles of surfaces 221 and 222 are selected to be very flat, thereby defining planar datum surfaces. In other embodiments, however, one or both of the surfaces can be curved or structured as described previously.

Furthermore, in additional embodiments, the reference mirror may be replaced with a partially reflective beam splitter (to define a surface equivalent to surface 221) and a separate reflective element (to define a surface equivalent to surface 222). In such embodiments, one or both of the beam splitter and the separate reflective element can be positioned on a translation stage (e.g., a z-stage) to adjust their separation, and thereby adjust the positions of datum planes $H_1$ and $H_2$ to accommodate the test part. Calibration and monitoring of the relationship between the datum planes can accomplished by DMI measurements to a DMI mirror on the z-stage in a manner similar to that described above.

Moreover, in other embodiments, the Michelson-type scanning interferometer shown in FIG. 22, can be replaced with any other interferometer arrangement suitable for scanning interferometric measurements (e.g., Twyman Green, Mirau, etc.).

Additional Examples of FTP and FPH Systems

Figure 23:
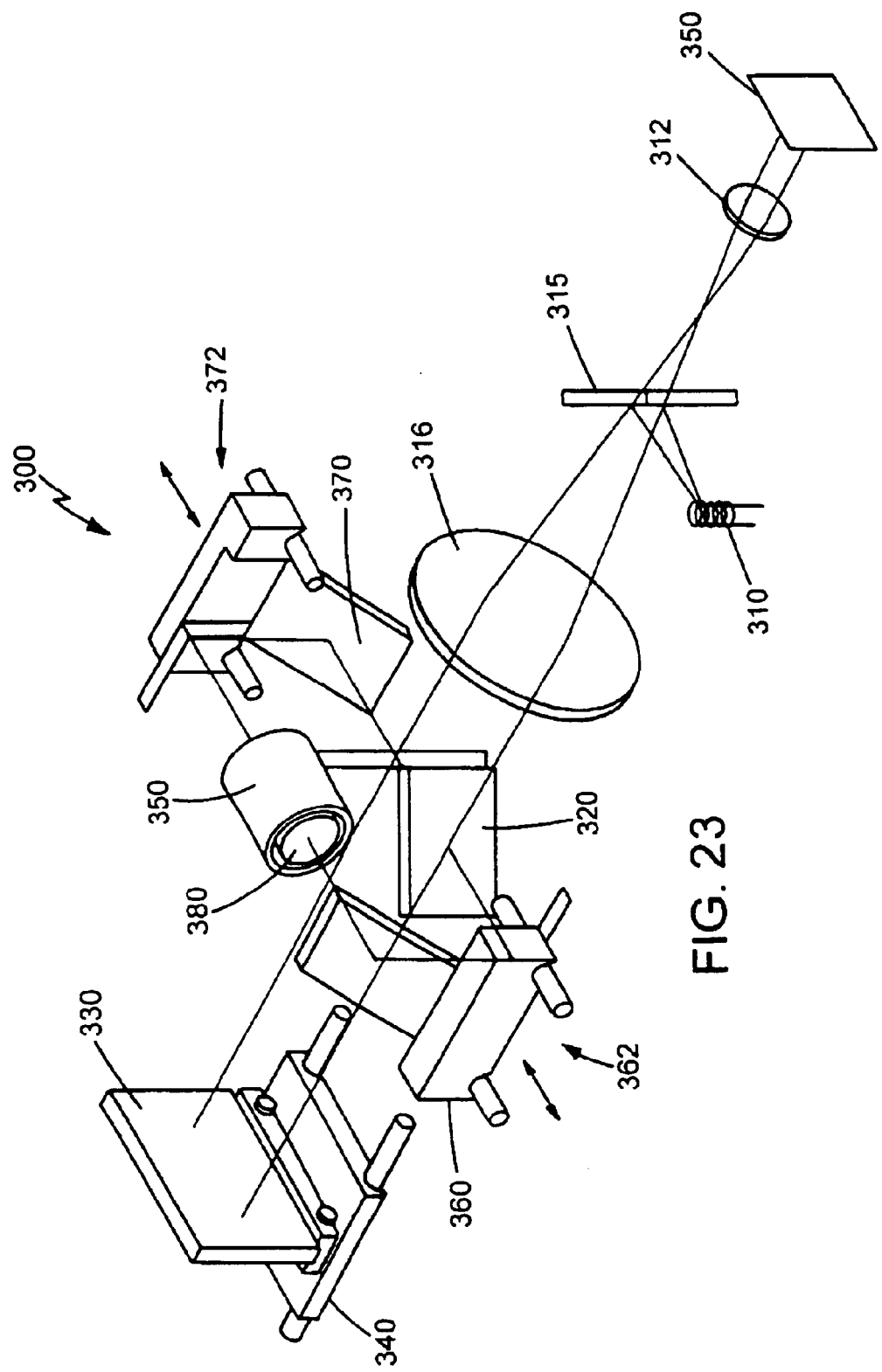
FIG. 23 is a perspective diagram of an infrared scanning FTP system using a gage block for calibration.

FIG. 23 shows an embodiment of an FTP system 300 based on IR scanning technology, although a similar configuration could be used with broadband radiation at other wavelengths (e.g., ultraviolet, visible, near-infrared, etc.). A beam splitter 320 splits the field of view (FOV) to provide, in effect, two optical profilers sharing a common source 310, common camera 350, and common optics (e.g., camera lens 312, beam splitter 315, beam splitter 320, reference mirror 330 mounted on scanning stage 340, and reference gage block 350). The instrument may be thought of as two Twyman Green interferometers sharing a common optics.

There are two fold mirrors 360 and 370 mounted on translations stages (e.g., z stages) 362 and 372, respectively. Beam splitter 320 includes two angled, beam-splitting surfaces. The first surface reflects a first portion of the broadband radiation towards fold mirror 360, the second surface reflects a second portion of the broadband radiation towards fold mirror 370, and both surfaces transmit the remaining broadband radiation to common reference mirror 330. Fold mirrors 360 and 370 direct their respective portions of the broadband radiation to opposite faces of a test object 380 and a hollow cylindrical gauge block 390. Gauge block 390 surrounds test object 380, and provides front and back surfaces in the split field of view (FOV) for calibration. During operation translation stages 362 and 372 adjust the optical path length of the measurement legs, effectively adjusting the nominal optical profiler datums $H_1$ $H_2$ with respect to the test part surfaces. The reference mirror scans over the range η to generate the height maps.

Figure 24:
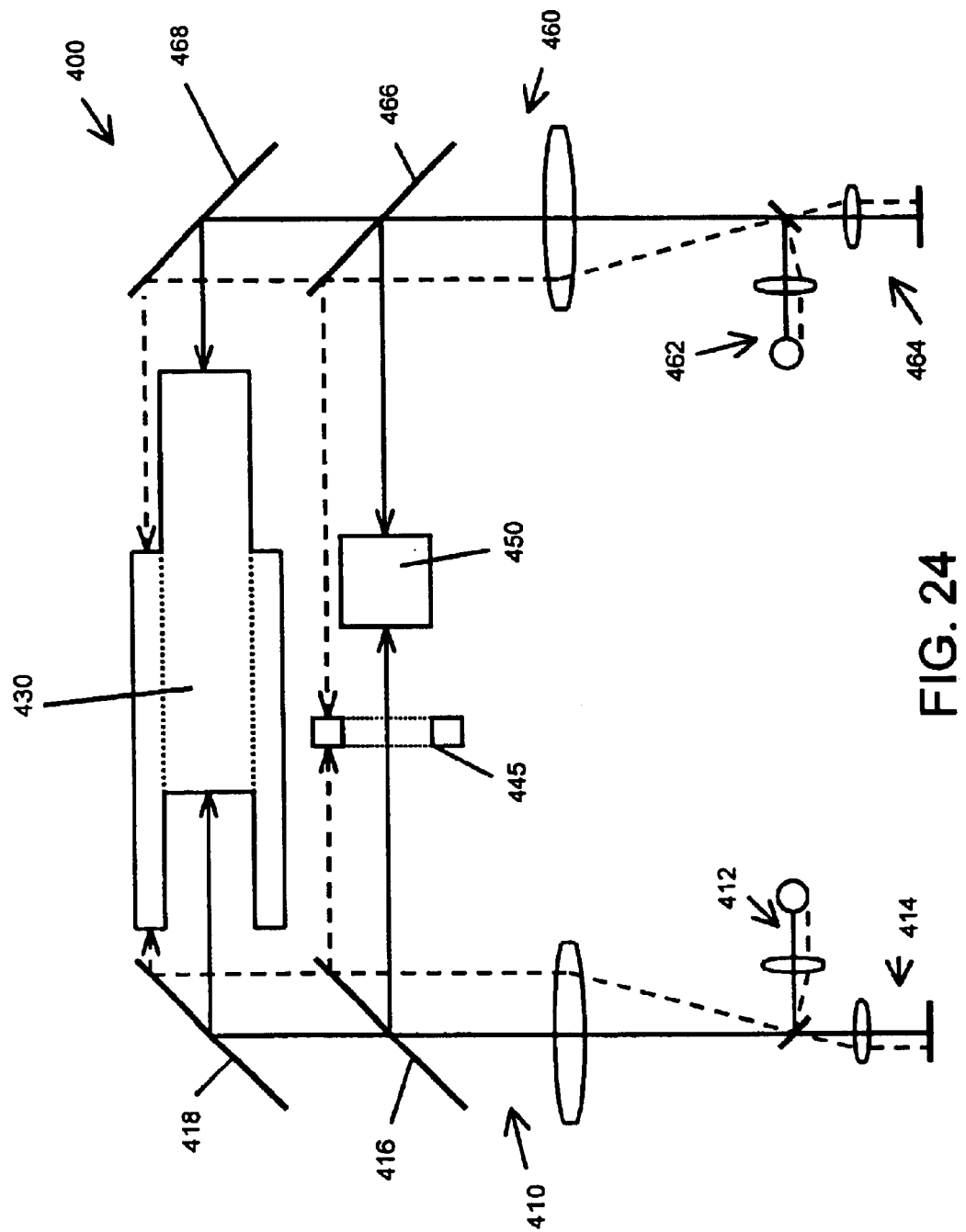
FIG. 24 is a schematic diagram of an FTP system using structured profiler datums.

FIG. 24 shows another embodiment of a scanning FTP system 400. FTP system 400 includes a structured reference object 430, to provide structured profiler datums. The system includes two independent Twyman-Green interferometers 410 and 460 linked by structured reference object 430, which replaces the more usual reference mirror. Interferometer 410 includes broadband source 412, camera 414, beam splitter 416, and fold mirror 418. Similarly, interferometer 460 includes broadband source 462, camera 464, beam splitter 466, and fold mirror 468. Notably, in this embodiment, structured reference object 430 provides master datum surfaces for initialization artifact 445 and test part 450 at the same time, thus translation or z-stages are not necessary. In other words, the structured reference makes it possible to profile initialization artifact 445 and test part 450 at the same time. The scanning function for this geometry may be fulfilled by displacement of the reference object, the test part or any other appropriate optical component.

If additionally there is a custom, removable structured reference for each test part of interest, the instrument accommodates a range of part sizes without large-scale mechanical motions. A fully characterized and stable structured reference also obviates the need for frequent recalibration.

Figure 25:
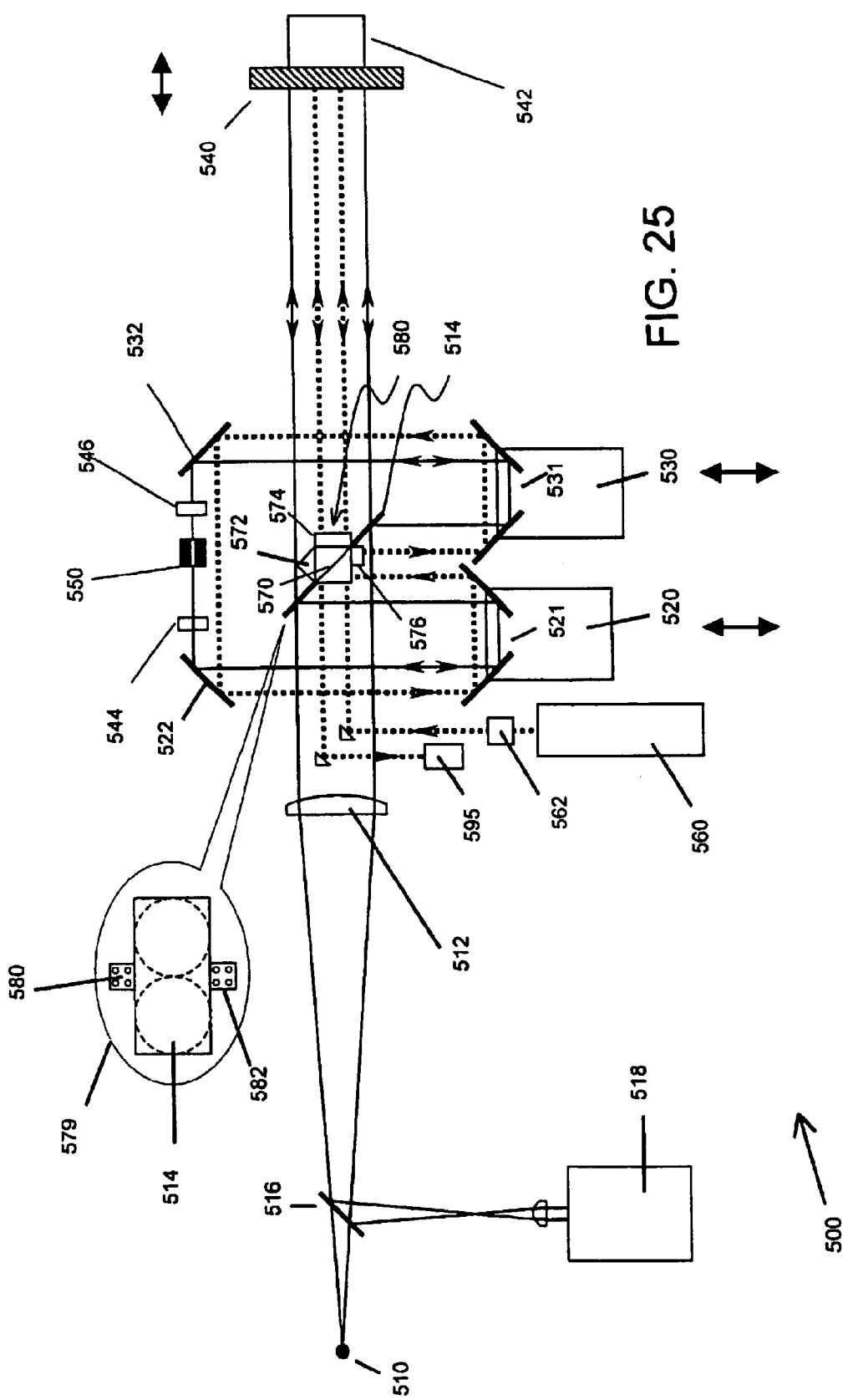
FIG. 25 is a schematic diagram of an IR scanning FTP system using a DMI for calibration.

FIG. 25 is a diagram of a dual-sided optical FTP system 500 based on IR scanning profiler technology and a 2-axis HeNe-based heterodyne DMI for the wavelength scale (e.g., the ZMI 510 from Zygo Corporation). As in the embodiment of FIG. 23, a similar arrangement can be used of other embodiments providing broadband radiation at other wavelengths (e.g., visible, UV, NIR, etc.) for the surface profiling.

Referring to FIG. 25, the broadband IR radiation is shown as solid lines and lies in the plane of the page along with the corresponding surface profiling optics, whereas the HeNe radiation is shown as dotted lines and lies above and below (not shown) the plane of the page, along with the DMI components, to provide the two axes of DMI metrology.

The scanning optical profiling system in system 500 includes a source 510 providing broadband IR radiation, which is collimated by lens 512 and incident on an IR beam splitter 514. IR beam splitter 514 splits the field of view by reflecting a first portion of the IR radiation to mirrors 521 on a first z stage 520, reflecting a second portion of the IR radiation to mirrors 531 on a second z-stage 530, and transmitting the remaining IR radiation to a reference mirror 540. Reference mirror 540 is modulated by a PZT-actuated flexure stage 542 with capacitive feedback, providing a 200-$\mu$m scanning range $\eta$. The scan is repeatable and takes less than 3 sec to complete, a relatively short time compared to the drift rate of any of the optical components. Z stage 520 directs the first portion of IR radiation to fold mirror 522, which directs it to a first surface of a test part 550, to define a first viewing port. Similarly, Z stage 530 directs the second portion of IR radiation to fold mirror 532, which directs it to a second surface of a test part 550, to define a second viewing port. Each of the two z-stages can be translated to adjust the nominal positions of the optical profiler datums $H_{1,2}$ to accommodate the first and second surfaces of the test part. IR beam splitter 514 recombines the broadband radiation reflected from the reference mirror and the two surfaces of the test object, and directs it to beam splitter 516, which in turn directs it to an IR imaging camera (e.g., a 10-micron microbolometer).

A ZnSe window with an antireflection (AR) coating one side and a ~5% partially reflective surface on the other side is positioned as an initialization artifact 544 between fold mirror 522 and test part 550, with the partially reflective surfaces nearest the test part. To initialize the instrument, the z stages are moved so that the scanning range $\eta$ for each of the two viewing ports overlaps the partially reflective surface. A window 546 positioned between test part 550 and fold mirror 532 has all of its surfaces AR-coated.

The geometry of the DMI system differs somewhat from that in the embodiment of FIG. 9. In particular, reference mirror 540 in FIG. 25 plays essentially the same role as the DMI mirror M in FIG. 9.

Referring to FIG. 25, a vertical beam doubler 562 splits the beam from a DMI source 560 (e.g., a Helium-Neon laser) to provide two axis of DMI vertically displaced above and below the plane of the page. As described above, only beam displaced above the plane is shown (as a dotted line) in the Figure. The two axes monitor a difference in the optical path difference (OPD) between the two viewing ports as well as any component rotatations about an axis parallel to the plane of the figure. The return beams from polarizing beam splitters (PBSs) positioned above and below IR beam splitter 514 (PBS) goes to a fiber-optic pick-up (FOP) 595 for signal detection. Only two measurements or "axes" are needed to monitor the unconstrained degrees of freedom in the optical system, as may be understood from the following discussion of the effects of various rigid body rotations of the optical components.

The mirror pairs 521 and 531 on the z stages 520 and 530, respectively, each form a rigid roof mirror. The same is true of the two fold mirrors 522 and 532 near the part. The two folds are mechanically constrained to have a highly stable orthogonal relationship (e.g. <5 $\mu$rad drift in relative angle). A rotation of any of the roof mirror structures about a vertical axis has no effect on measured FTP of the part. A rotation of the reference mirror or the beamsplitter about a vertical axis modifies only the apparent longitudinal position of the test part, assuming that the DMI measurement of OPD intersects the line of symmetry for the two reference paths (e.g. there is no Abbé error). We can assume that one of the orientation angles will always be the same, e.g. $\alpha_{W M}-\alpha_{W^o M^o}=0$ and therefore we need not monitor this angle. A rotation of any of the components about a horizontal axis, however, couples directly into the apparent parallelism of the part; thus this rotation must be monitored. Two DMI beams projected symmetrically to upper and lower sides of the plane of the figure account for both rotations about the horizontal axis and the overall OPD of the system.

The DMI optics include two high-stability plane mirror interferometers (HSPMI's) 580 and 582 positioned above and below IR beam splitter 514, as shown in inset 579. For each DMI axis, there are two orthogonally polarized beams circulating in the measurement path in the same direction. HSPMI 580 includes a PBS 570, a corner cube reflector 572. a quarter-wave plate 574, and a half-sized half-wave plate 576. HSPMI 582 includes an identical set of optics below the plane of the page. The HSPMIs uses the half-sized half-wave plate instead of the usual full-sized quarter-wave plate to rotate the polarization of the measurement beam, so that all of the measurement beams are linearly polarized when reflecting from the various fold mirrors. In other embodiments, conventional HSPMIs can be used in which a full-sized quarter-wave plate replaces the half-sized half-wave plate.

Other embodiments of the instrument in FIG. 25 can accommodates the structured profiler datum concepts described above by e.g., either (1) providing a structured reference mirror or (2) a structured mirror, window or other combination of optical components in the measurement path.

Figure 26:
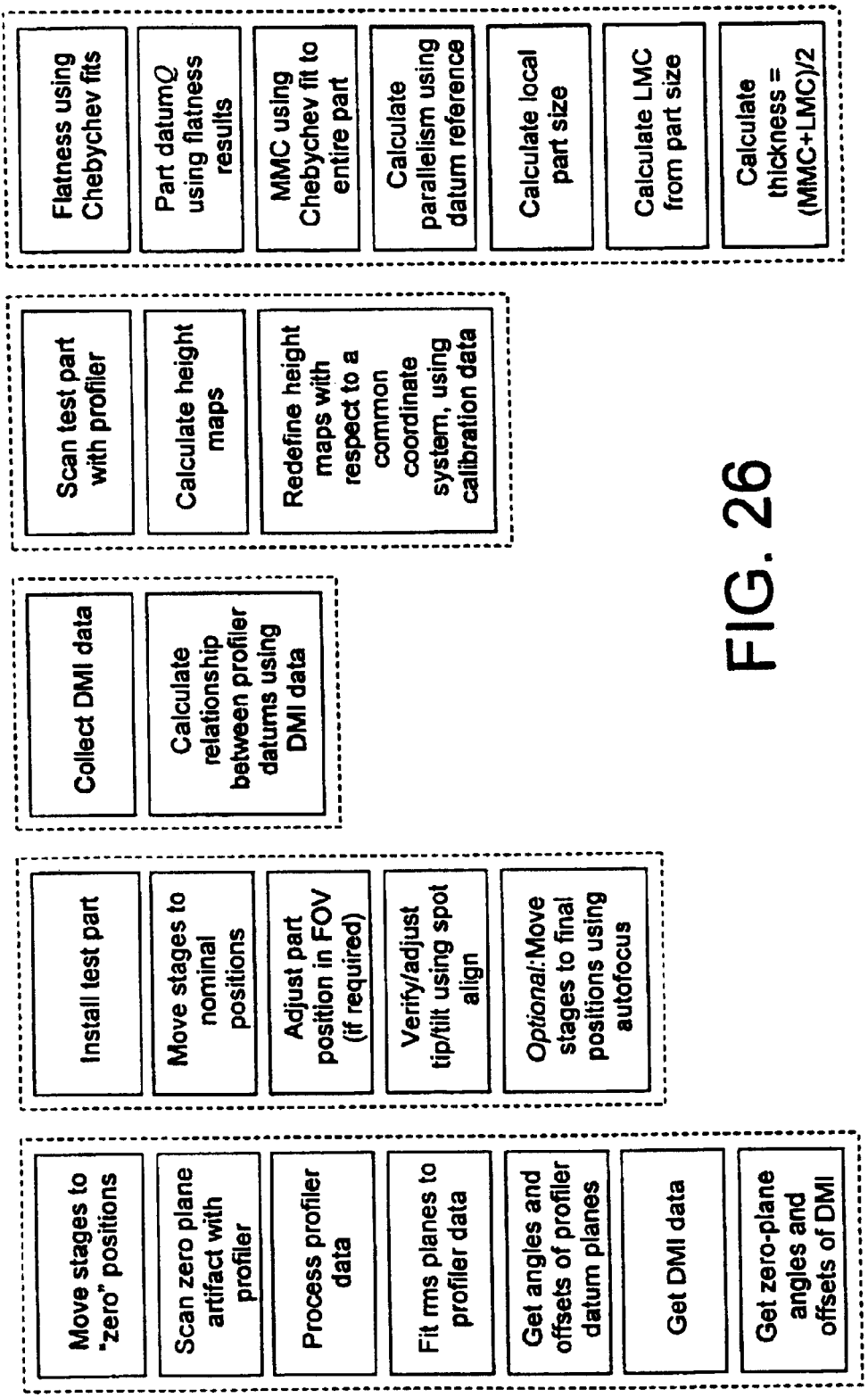
FIG. 26 is a flow chart describing operation of the IR scanning FTP system of FIG. 25.

FIG. 26 is a flowchart of the measurement procedure for the system of FIG. 25.

The first column describes the initialization procedure. First, the z-stages are moved to bring the zero plane initialization surfaces $Z_1$, $Z_2$ (i.e., the internal and external reflections from the partially-reflecting surface of the zero plane artifact) within the scanning range $\eta$ of both of the optical profiler ports. Then the profilers do a fine scan over the range $\eta$ to acquire surface height profiles $h_{H_1^o Z_1}(x,y)$, $h_{H_1^o Z_1}(x,y)$ of initialization surfaces $Z_1$, $Z_2$ with respect to the optical profiler datums $H_1^o$, $H_2^o$. Based on this data, an electronic processor (not shown) coupled to the system calculates a least squares fit of artifact planes $Z'_1$, $Z'_2$ to the surface profile data $h_{H_1 Z_1}^o$, $h_{H_2 Z_2}^o$, and extracts $\alpha_{H_1^o Z'_1}$, $\beta_{H_1^o Z'_1}$, $\alpha_{H_2^o Z'_2}$, $\beta_{H_2^o Z'_2}$, and $D_{H_1^o Z'_1}$, $D_{H_2^o Z'_2}$ from height profiler data $Z'_1$, $Z'_2$. Next, DMI data is acquired for DMI mirror $M^o$ with respect to the DMI internal reference datum $W^o$ for z-stage positions corresponding to the initialization. From this data, the electronic processor extracts initial orientation and separation of $M^o$ with respect to $W^o$ and uses it to calculate the relationship between the two optical profiler datums $H_1^o$, $H_2^o$ using Eq. 4. Accordingly, the initialization provides the electronic processor with the following information $\alpha_{W^o M^o}$, $\beta_{W^o M^o}$, $D_{W^o M^o}$ and $\alpha_{H_1^o H_2^o}$, $\beta_{H_1^o H_2^o}$, $D_{H_1^o H_2^o}$.

The second column of FIG. 26 describes the part set-up. First, the test part is positioned in a mount or support fixture (not shown), and then the Z-stages are moved to bring the object surfaces within the scanning range η of the respective optical profilers. If desired, the part position can then be adjusted with respect to the system FOV.

The third column of FIG. 26 describes DMI calibration. DMI data is collected for DMI mirror M with respect to the DMI internal reference datum W according to the z-stage positions for the test part. Then electronic processor extracts $\alpha_{WM}$, $\beta_{WM}$ and $D_{WM}$ from the DMI data, and calculates the relationship between the two optical profiler datums $H_1$, $H_2$ using Eq. (5) to produce outputs $\alpha_{H_1H_2}$, $\beta_{H_1H_2}$, $D_{H_1H_2}$.

The fourth column of FIG. 26 describes data acquisition for the test part. The optical profilers scan over their scanning range η and determines surface height profiles $h_{H_1\Sigma_1}$(x,y), $h_{H_2\Sigma_2}$(x,y) of part surfaces $\Sigma_1$, $\Sigma_2$ with respect to the optical profiler datums $H_1$, $H_2$. Electronic processor then calculates $h_{H_1\Sigma_2}$(x,y) from the surface height and calibration data using Eq. (1).

The last column of FIG. 26 describes FTP calculations based on the acquired data. For example, the electronic processor can calculate flatness from the results of Chebychev fits to $h_{H_1\Sigma_1}$(x,y), $h_{H_1\Sigma_2}$(x,y). Local part size can be calculated according to $h_{\Sigma_1\Sigma_2}$(x,y)=$h_{H_1\Sigma_2}$(x,y)−$h_{H_1\Sigma_1}$(x,y). MMC can be calculated from the results of a Chebychev fit to total part $h_{\Sigma_1\Sigma_2}$(x,y), and LMC is given by the minimum value of $h_{\Sigma_1\Sigma_2}$(x,y). Furthermore, by defining a datum Q to be the outermost plane resulting from the Chebychev flatness fit to the surface $\Sigma_1$: parallelism can be calculated as the high point minus the low point on surface $\Sigma_2$ with respect to datum Q; thickness 1 can be calculated as the average of the high and low points on $\Sigma_2$ with respect to Q; thickness 2 can be calculated as the mean value (max-min) of $h_{\Sigma_1\Sigma_2}$(x,y); and thickness 3 can be calculated as the average value of MMC and LMC.

Interferometric Absolute Height Measurements

The optical profiling systems described herein optically profile two or more surfaces of a test object to determine one or more geometric properties of the object. The surfaces are each profiled with respect to a fixed datum surface or coordinate system, and the respective coordinate systems are then related to one another. As a result, the surface profiling provides absolute positions in a common coordinate system for a plurality of points on each surface. This is in contrast to relative surface profile measurements where the heights of some points on the surface are determined relative to other points on the surface to thereby measure surface texture. Thus, for the optical profiling described herein, the measurements provide the overall position (piston), tip and tilt of the object part with respect to the datum surface (i.e., a reference surface independent from the test part), in addition to providing the form and texture of the surface.

The accuracy of such interferometric absolute surface profiling measurements can be improved by accounting for the phase change on reflection (PCOR) and PCOR dispersion (i.e., the frequency dependent variations in PCOR) of the surface material of the test part and the optics of the interferometry system. As indicated below, failure to account for PCOR dispersion in scanning interferometric measurements, even for test parts having uniform PCOR dispersion properties, produces an erroneous shift in the distance from the datum surface to the test surface. Moreover, when the PCOR properties of the test surface vary because the test surface includes dissimilar materials, failure to account for PCOR dispersion can introduce errors in the relative heights of different points on the test surface.

Figure 27:
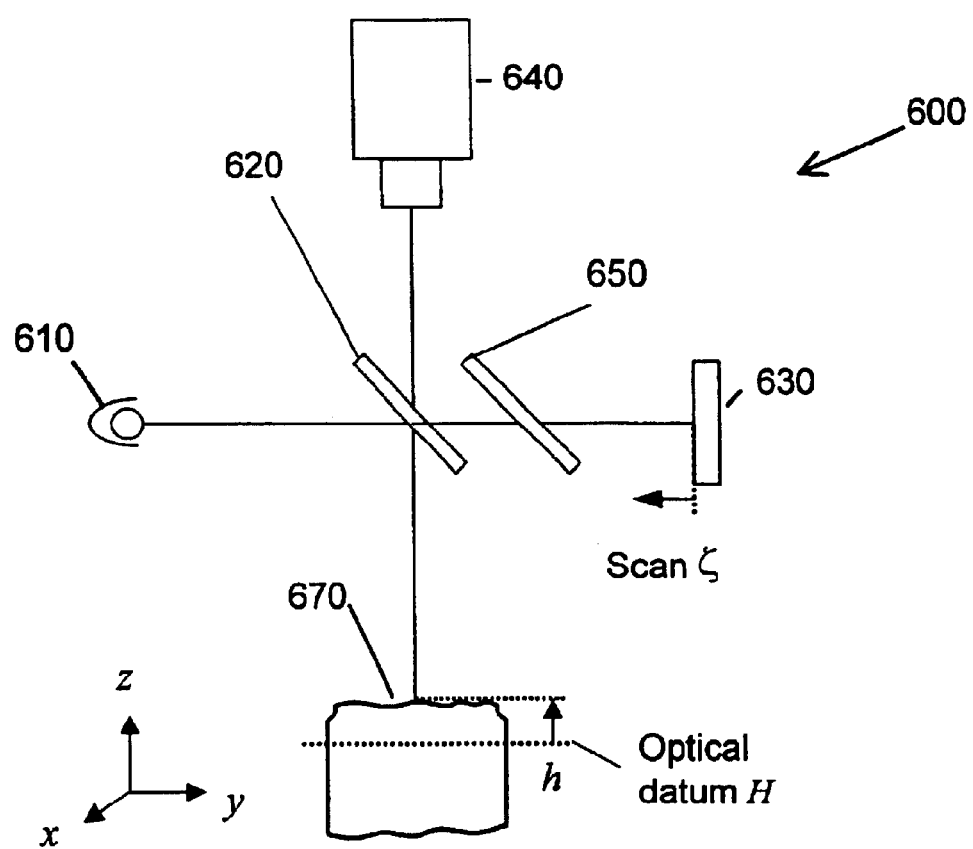
FIG. 27 is a schematic drawing of a two-beam Michelson interferometer.

Interferometric contributions of PCOR and PCOR dispersion are explained with reference to a two-beam scanning Michelson interferometer 600 (FIG. 27). Scanning interferometer 600 operates similarly to those described above to measure the height profile of test surface 670. Interferometer 600 includes broadband source 610, beam splitter 620, scanning reference mirror 630, camera 640, and dispersion compensator 650. The interferometer is arranged to measure a height h in the z coordinate direction at each point x,y on an object part surface using interference phase information. The virtual surface H is the optical profiler datum to which all height and interference phase measurements are referenced. To first order in the angular wavenumber k=2π/λ, the interference phase φ with respect to H is $$\phi(k)=2nk(h-\zeta)+(\gamma_{part}+\gamma_{sys})+(\tau_{part}+\tau_{sys})(k-k_0), \quad (9)$$

where $k_0$ is the nominal wavenumber, ζ is the reference mirror scan position, $\gamma_{part}$ is the part surface phase change on reflection (PCOR), and $\gamma_{sys}$ is the system phase offset with respect to H attributable to the interferometer system. The value $\gamma_{sys}$ includes PCOR contributions from the interferometer optics and any constant offsets resulting, e.g. from the starting position of the scan ζ. The linear dispersions coefficients $\tau_{part}$ and $\tau_{sys}$ correspond to the phase offsets $\gamma_{part}$ and $\gamma_{sys}$, respectively. The phase offsets $\gamma_{part}$,$\gamma_{sys}$ are evaluated at the nominal wavenumber $k_0$. The index of refraction n for air and is assumed to be independent of wavenumber. Those skilled in the art will appreciate that the teachings of the invention can be extended to denser transparent media than air by taking into account the wavenumber dependence of material index. All of the terms in Eq. 9, are potentially a function of field position x,y, although for the subsequent description, the variables n,ζ, $k_0$ are assumed to be constant over the field of view.

In scanning interferometric measurements, the light source provides broadband radiation so that interference fringes are only produced when the optical path difference (OPD) between the reference and measurement legs are within the coherence length of the broadband radiation. Thus, scanning interferometric measurements can be considered a "coherence profiling" mode in that it uses the broadband nature of the interference effect, e.g. the localization of fringe contrast or equivalently, the measurement of the rate of change of interference phase with wavenumber.

Figure 28:
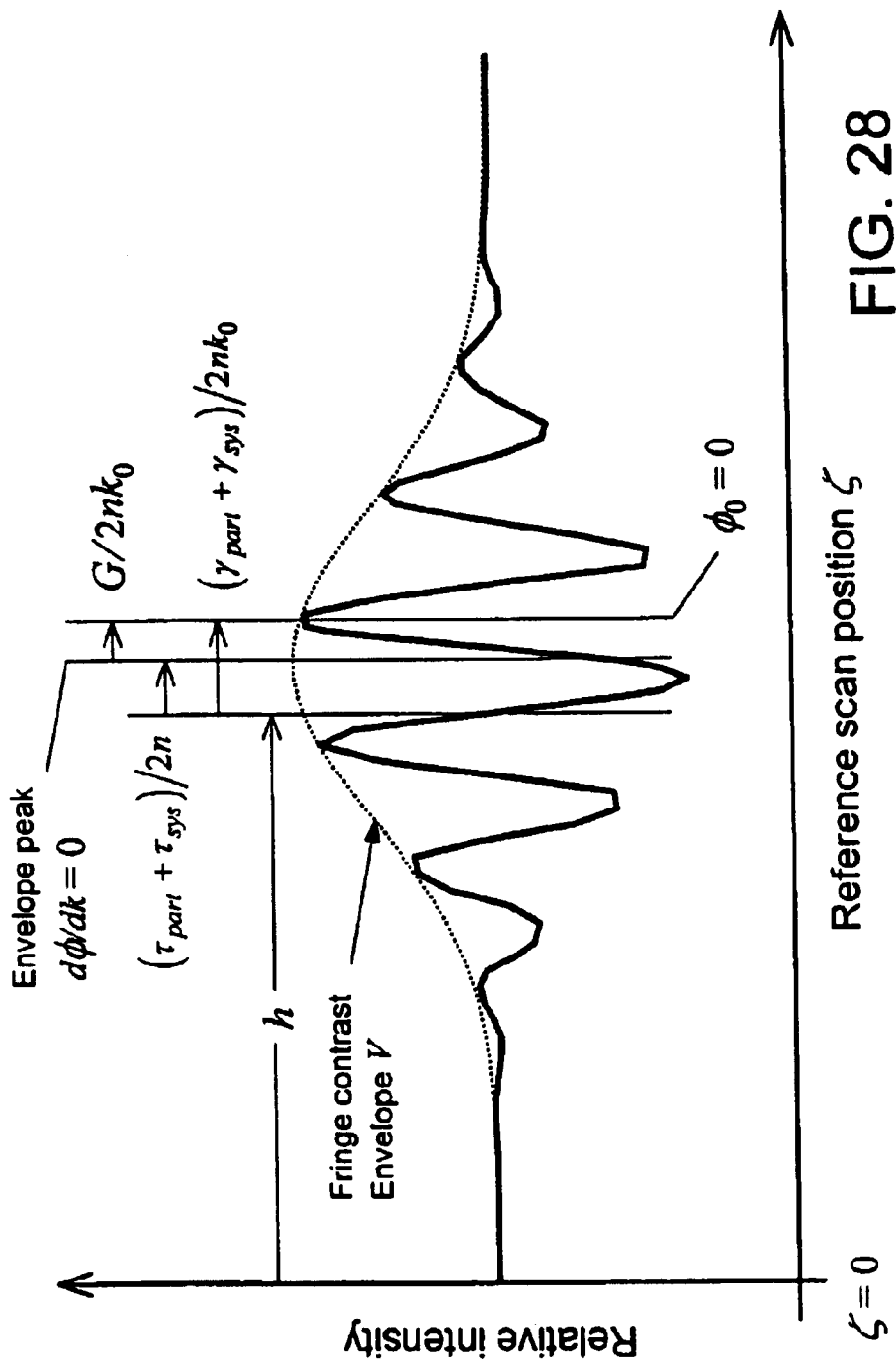
FIG. 28 is a graph illustrating interferometric coherence profiling data and the effects of PCOR and PCOR dispersion.

FIG. 28 shows an example of a coherence profiling intensity signal as the reference mirror position ζ is scanned. According to Eq. 9, the overlapping interference fringes for the various emissions of the broadband source result in a normalized intensity I given by $$I=1+V[h+(\tau_{sys}+\tau_{part})/2n-\zeta]\cos[2nk_0(h-\zeta)+\gamma_{part}+\gamma_{sys}] \quad (10)$$

where V is the fringe contrast envelope. The envelope V is proportional to the Fourier Transform of the spectral distribution of the light as detected by the camera, including the spectral sensitivity of the camera itself. In FIG. 28, it is assumed that the light source has a symmetric, approximately gaussian, spectral emission.

For a symmetric contrast envelope, the peak value of the fringe contrast envelope is given by the scan position for which dφ/dk=0. This is the stationary phase position, where the interference phase is the same independent of wavenumber, and all of the interference patterns add up constructively. More generally, it can be shown that the stationary phase condition dφ/dk=0 corresponds approximately to the centroid of the square of the fringe contrast envelope V. The phase gap G between the stationary phase position and the nearest zero phase point φ=0 position is given by $$G=(\gamma_{part}+\gamma_{sys})-k_0(\tau_{sys}+\tau_{part}). \quad (11)$$

This is a constant phase offset, independent of wavenumber k, but dependent on the system and part parameters. The phase $\phi_0$ is the phase at the nominal wavenumber $k_0$ (with respect to a $\zeta=0$ scan position), e.g., from Eq. (9) we have $$\phi_0 = 2nk_0h + (\gamma_{part} + \gamma_{sys}). \tag{12}$$

From Eq. 10 and FIG. 28, it can be seen that the maximum or peak fringe contrast occurs at the scan position $\zeta = h + (\tau_{sys} + \tau_{part})/2n$. Thus, in one data processing embodiment, the system determines the fringe-contrast envelope V as a function of $\zeta$, e.g., by electronic or digital conversion, for every camera pixel. It then determines the scan position $\zeta_{max}$ for which the envelope V reaches a specific value, e.g., its maximum or peak value. The corresponding height h is this scan position minus the dispersion offset:

$$h = \zeta_{max} - (\tau_{sys} - \tau_{part})/2n. \tag{13}$$

In another signal processing method, the coherence profiling intensity signal is Fourier transformed with respect to the scan position $\zeta$ into the frequency domain (i.e., with respect to frequency wave number k). The phase of the transformed data corresponds directly to the phase $\phi(k)$ in Eq. 9. From this phase, the signal processor calculates the phase derivative $d\phi/dk$, and determines height h for each camera pixel according to:

$$h = \frac{1}{2n}\frac{d\phi}{dk} - (\tau_{sys} - \tau_{part})/2n \tag{14}$$

where the derivative $d\phi/dk$ is calculated for $\zeta=0$. Eq. 14 follows directly from Eq. 9.

From Eqs. (13) and (14), one sees that surface height measurements based on coherence profiling data can be more accurately calculated by accounting, e.g., by calibration, for PCOR dispersion for the interferometry system and the test part (e.g., $\tau_{sys}$ and $\tau_{part}$, respectively).

In addition to coherence profiling, surface profile measurements can also be based on interferometric phase profiling data where the interferometric phase $\phi(k)$ is measured directly for one or more wavenumbers k. For example, phase shifting interferometry (PSI) techniques can be used for such measurements. From Eq. 9, it is clear that if direct interferometric phase measurements are used to determine height h, accounting for PCOR $\gamma_{part}$ and $\gamma_{sys}$ (and PCOR dispersion $\tau_{part}$ and $\tau_{sys}$ for wave numbers other than the nominal wave number $k_0$) improves the accuracy of the height measurement.

Generally, the sensitivities to particular noise sources for coherence profiling measurements differ from those for phase profiling measurements, thus a particular technique may be preferable for a particular application, or they may be used to complement one another. One drawback of many phase profiling measurements, however, is the measured phase $\phi(k)$ includes $2\pi$ fringe ambiguity. For relatively smooth surfaces, relative fringe ambiguity over the surface may be interpolated from the data of multiple camera pixels using standard fringe unwrapping procedures. More generally, however, it is preferable to have an independent measurement, such as coherence profiling data, to remove such fringe ambiguity. Thus, to obtain absolute surface profile measurements, the coherence profiling height measurement can be used alone, or it can be used to remove the absolute fringe ambiguity from the phase profiling measurement, which may be more accurate than the coherence measurement in some cases.

In one such embodiment, the height h determined from a coherence profiling measurement is used to calculate an absolute phase profiling height measurement h' based on phase profiling data for the phase $\phi_0 = \phi(k_0)$ according to:

$$h' = \frac{1}{2nk_0}\left\{(\phi_0 - \gamma_{part} - \gamma_{sys}) - 2\pi Int\left[\frac{(\phi_0 - \gamma_{part} - \gamma_{sys}) - (2k_0nh)}{2\pi}\right]\right\} \tag{15}$$

where Int[ ] returns the nearest integer to its argument. Eq. 15 can be applied independently to every point x,y on the part surface. Again, as is apparent from Eq. 15, accounting for PCOR $\gamma_{part}$ and $\gamma_{sys}$ improves the accuracy of the absolute phase profiling measurement. Moreover, Eq. 15 implicitly depends on PCOR dispersion values $\tau_{part}$ and $\tau_{sys}$ through the coherence profiling determination of h.

Figure 29:
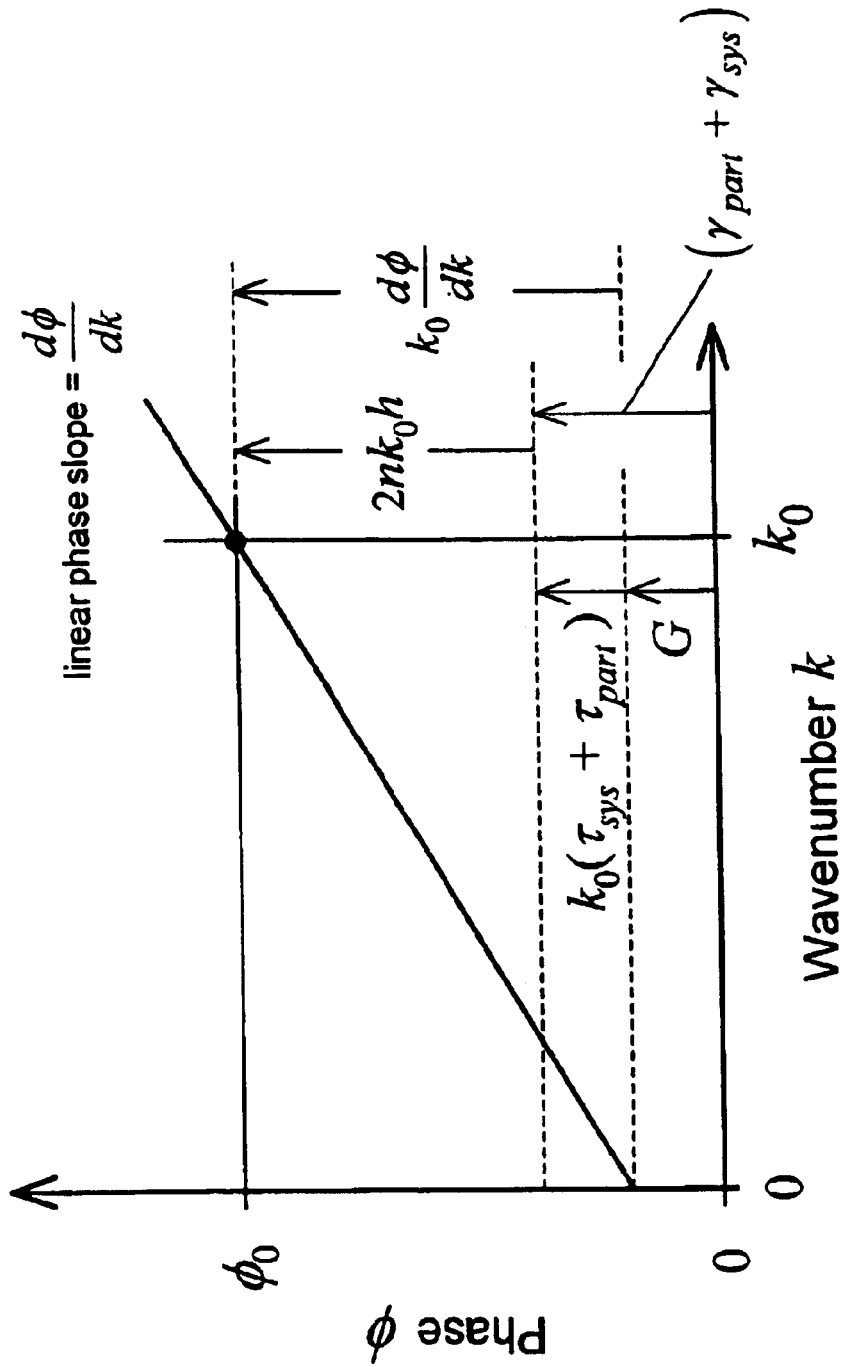
FIG. 29 is a graph of interferometric phase as a function of wave number to illustrate to the effects of PCOR and PCOR dispersion.

FIG. 29 shows graphically how the frequency transformed coherence profiling data $\phi(k)$ removes fringe ambiguity from a phase profiling measurement. The line $d\phi/dk$ showing the rate of change of phase is evaluated by taking a few phase data points about $\phi_0$. The line removes the fringe-order ambiguity, provided we know the phase-axis intercept point G for the line according to Eq. 11. The evaluation is for a reference scan position $\zeta=0$ although the raw data for determining phase and phase derivative data require a scan such as that shown in FIG. 28. Note that in this graph, the gap G is the phase-axis intercept point, i.e., the phase at zero wavenumber.

To make use of the expressions above for calculating absolute height measurements, values for PCOR and PCOR dispersion are determined for the system and the part. The procedure that establishes $\gamma_{sys}$, $\tau_{sys}$ is a system characterization. System characterization also establishes implicitly the location and shape of the optical profiler datum H. System characterization involves a characterization artifact having known optical properties $\gamma_{art}$, $\tau_{art}$ and surface form $h_{art}$. The artifact is inserted temporarily in the field of view and a measurement of the x,y-dependent phase profile $\phi_0$ provides the necessary information for determining the system phase offset $\gamma_{sys}$:

$$\gamma_{sys} = \phi_0 - \gamma_{art} - 2nk_0h_{art}, \tag{16}$$

where it is understood that all values potentially have an x,y field dependence. Note that the phase profile $\phi_0$ must be unwrapped, meaning that $2\pi$ fringe jumps must be removed under the assumption that the artifact is a continuous surface.

The procedure defined by Eq. (16) effectively locates the optical profiler datum H to the surface of origin of the pre-determined surface profile map $h_{art}$. Thus, for example, if the artifact is known to be perfectly flat, we can set $h_{art}=0$ for all x,y and the optical profiler datum H is defined as a plane coincident with the surface of the characterization artifact. Any tip/tilt or unaccounted-for surface profile information would in this case be incorporated into the system phase offset $\gamma_{sys}$.

Once the $\gamma_{sys}$ is known, the value of $\tau_{sys}$ can be determined as $$\tau_{sys} = (\gamma_{art} + \gamma_{sys} - G_{ex})/k_0 - \tau_{art} \tag{17}$$

where $G_{ex}$ is the experimentally-observed phase gap (see FIG. 29):

$$G_{ex} = \phi_0 - k_0 \frac{d\phi}{dk}\bigg|_{\zeta=0} \quad (18)$$

Here again, all of the values with the exception of n and $k_0$ are expected to have an x,y, field dependence related to optical distortions such as chromatic and spherical aberrations. There may also be a dependence on the tip and tilt of the part, which if it is substantial, will have to be recorded and used in the remaining calculations in much the same way as the x,y field dependence.

It is not necessary to preserve the overall tip, tilt and piston of the system parameters $\gamma_{sys}$, $\tau_{sys}$, which are partly a function of the location and orientation of the characterization artifact itself. Thus it is permitted to subtract common tip, tilt and piston terms from the field-dependent $\gamma_{sys}$, $\tau_{sys}$ data, as long as it is done in exactly the same manner for both $\gamma_{sys}$, $\tau_{sys}$, so as to preserve the relationship between these terms. This is effected by first removing tip/tilt from $\gamma_{sys}$, then recalculating $\tau_{sys}$ using Eq. (17). Adjusting the tip, tilt and piston of the system parameters is equivalent to adjusting the tip, tilt and piston of the optical profiler datum H.

Alternatively, if we preserve the overall tip, tilt and piston of the system parameters $\gamma_{sys}$, $\tau_{sys}$, and if the initialization artifact is identical to the characterization artifact, it is possible to set one or more of the initial geometric parameters, e.g. $\alpha_{H_1^0 Z_1^0}$, $\beta_{H_1^0 Z_1^0}$, $D_{H_1^0 Z_1^0}$ to zero; realizing that these tip, tilt and piston parameters are already incorporated in $\gamma_{sys}$, $\tau_{sys}$ We have several options for a characterization artifact. The simplest is an uncoated glass part or other pure dielectric. In this case, we know with great certainty that $\gamma_{art}=0$ and (apart from tip and tilt) $\tau_{art}=0$ for all x,y. Then assuming that the artifact has the exact same shape as the optical profiler datum we wish to establish, we have simply $\gamma_{sys}=\phi_0$ (flat dielectric artifact) and $\tau_{sys}=G_{ex}$ (dielectric artifact). Note that the former expression defines the location and shape of the optical datum H to be identical to the location and surface shape of the dielectric artifact itself.

If the artifact is sufficiently transparent, it can remain in the measurement path as a permanent part of the system. To characterize the system, the reference mirror scans to a position for which the partial surface reflection of the transparent artifact generates interference. To measure the test part, the reference mirror is scanned to a position for which the interference effects from the transparent artifact have nearly zero contrast. In this case, care must be taken to accommodate the difference between the phase change on reflection and on the phase change on transmission for the characterization surface.

Part PCOR values $\gamma_{part}$ can be calculated from well-established physics principles governing reflection from an interface (e.g., the Fresnal equations) and tabulated values for the complex refractive index n+ik of the part material. The part PCOR dispersion value $\tau_{part}$ can be determined in a manner similar to the system characterization using the experimentally observed phase gap $G_{ex}$ and known values for $\gamma_{part}$ and $\tau_{sys}$:

$$\tau_{part}=(\gamma_{part}-G_{ex})/2nk_0-\tau_{sys} \quad (19)$$

For most pure materials, we expect the height offset $\tau_{part}/2n$ to be of the same order of magnitude as $\gamma_{part}/2nk_0$ and to have the same sign. An alternative method for determining $\tau_{part}$ is to calculate the dispersion of calculated PCOR values using tabulated values of n+ik as a function of wavelength.

Electronic Processors

For any of the embodiments described above, a one or more controllers or computers can be used to control different components (e.g., scanning mirrors and z-stages), acquire data (e.g., from an IR camera and DMI detector), and/or make calculations (e.g, FTP, FTPO, and FPH) based on the acquired data. The analysis steps described above can be implemented in computer programs using standard programming techniques. Such programs are designed to execute on programmable computers each comprising an electronic processor, a data storage system (including memory and/or storage elements), at least one input device, and least one output device, such as a display or printer. The program code is applied to input data (e.g., images from the camera) to perform the functions described herein and generate output information (e.g., geometric properties of the test object), which is applied to one or more output devices. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the analysis described herein.

Other Embodiments

Other embodiments are within the scope of the invention. For example, rather than, or in addition to, calibrating the coordinate systems of the optical profilers by using a gage block or a displacement measuring interferometer, other embodiments can include capacitive sensors, LVDT, and/or optical encoders to monitor the coordinate systems defined by the optical profilers and the test part.

Other aspects, advantages, and modifications are within the scope of the following claims.

What is claimed is:

1. A method for determining a geometric property of a test object, the method comprising:
    interferometrically profiling a first surface of the test object with respect to a first datum surface;
    interferometrically profiling a second surface of the test object with respect to a second datum surface different from the first datum surface;
    determining a spatial relationship between the first and second datum surfaces based on at least one interferometric displacement measurement; and
    calculating the geometric property based on the interferometrically profiled surfaces and the spatial relationship between the first and second datum surfaces.

2. The method of claim 1, wherein the interferometric profiling of the first surface provides a distance to each of a plurality points on the first surface from a corresponding point on the first datum surface.

3. The method of claim 2, wherein the interferometric profiling of the second surface provides a distance to each of a plurality points on the second surface from a corresponding point on the second datum surface.

4. The method of claim 1, wherein the first datum surface is a portion of a plane.

5. The method of claim 1, wherein the first datum surface is curved.

6. The method of claim 1, wherein the first datum surface has a structured profile.

7. The method of claim 1, wherein the first surface is spaced from the second surface.

8. The method of claim 1, wherein the first and second surfaces correspond to opposite faces of the test object.

9. The method of claim 1, wherein the first and second surfaces correspond to adjacent faces of the test object.

10. The method of claim 1, wherein the first and second surfaces are adjacent faces separated by a step height.

11. The method of claim 1, wherein the first and second surfaces are displaced from one another by a distance greater than a range of the interferometric profiling of the first surface and greater than a range of the interferometric profiling of the second surface.

12. The method of claim 1, wherein the interferometric profiling of the first surface comprises directing electromagnetic radiation to the first surface along a first direction and the interferometric profiling of the second surface comprises directing electromagnetic radiation to the second surface along a second direction different from the first direction.

13. The method of claim 1, wherein the interferometric profiling of the first surface comprises positioning the test object relative to an interferometry system and the interferometric profiling of the second surface comprises repositioning the test object relative to at least one component of the interferometry system.

14. The method of claim 13, wherein the repositioning of tile test object relative to the interferometry system comprises moving the test object.

15. The method of claim 13, wherein the repositioning of the test object relative to the interferometry system comprises moving the at least one component of the interferometry system.

16. The method of claim 15, further comprising interferometrically measuring the movement of the at least one component of the interferometry system to determine the spatial relationship between the first and second datum surfaces and provide the interferometric displacement measurement.

17. The method of claim 1, wherein the relationship between the first and second datum surfaces is defined by a distance between corresponding reference points on the first and second datum surfaces and two angles defining a relative orientation of the first and second datum surfaces.

18. The method of claim 1, further comprising determining the spatial relationship based on the at least one interferometric distance measurement and an initial calibration.

19. The method of claim 1, further comprising adjusting at least one of the first and second datum surfaces to accommodate the interferometric profiling of the first and second surfaces of the test object and interferometrically measuring the adjustment of the at least one of the first and second datum surfaces to determine the spatial relationship between the first and second datum surfaces.

20. The method of claim 1, wherein the geometric property is flatness of the test object.

21. The method of claim 1, wherein the geometric property is thickness of the test object.

22. The method of claim 1, wherein the geometric property is parallelism of the test object.

23. The method of claim 1, wherein the geometric property is a step height.

24. The method of claim 1, wherein the geometric property is angular orientation of the first surface relative to the second surfaces.

25. The method of claim 24, wherein the geometric property is perpendicularity of the first and second surfaces.

26. The method of claim 1, wherein the geometric property is roundness of the test object.

27. The method of claim 1, wherein the geometric property is defined by positions in a common coordinate system of a plurality of points on the first surface and a plurality of points on the second surface.

28. The method of claim 1, wherein the interferometric profiling of at least one of the first and second surfaces comprises performing scanning, white light interferometry.

29. The method of claim 1, wherein the interferometric profiling of at least one of the first and second surfaces comprises performing infrared, scanning interferometry.

30. The method of claim 1, wherein the interferometric profiling of at least one of the first and second surfaces comprises performing scanning MESA interferometry.

31. The method of claim 1, wherein the interferometric profiling of at least one of the first and second surfaces comprises performing scanning, grazing-incidence interferometry.

32. The method of claim 1, wherein the interferometric profiling of at least one of the first and second surfaces comprises performing multiple wavelength interferometry.

33. The method of claim 1, wherein the test object is partially transparent.

34. The method of claim 33, wherein the geometric property is determined by positions of a plurality of point on a front surface of the test object relative to positions of a plurality of points on a back surface of the test object.

35. A method for determining a geometric property of a test object, the method comprising:
   interferometrically profiling a first surface of the test object with respect to a first datum surface;
   interferometrically profiling a second surface of the test object with respect to a second datum surface different from the first datum surface;
   determining a spatial relationship between the first and second datum surfaces; and
   calculating the geometric property based on the interferometrically profiled surfaces and the spatial relationship between the first and second datum surface,
   wherein the determining of the spatial relationship comprises:
      interferometrically profiling a first surface of a initialization artifact with respect to the first datum surface;
      interferometrically profiling a second surface of the initialization artifact with respect to the second datum surface;
      calculating an initial spatial relationship between the first and second datum surfaces based on at least the profiled surfaces of the initialization artifact; and
      adjusting the first and second datum surfaces to accommodate the first and second surfaces of the test object,
   wherein the first and second surfaces of the initialization artifact are the front and back of a common interface.

36. The method of claim 35, wherein the determining of the spatial relationship further comprises:
   interferometrically measuring at least one displacement corresponding to the adjustment of the first and second datum surfaces.

37. The method of claim 35, further comprising providing at least one calibrated dimension for the initialization artifact, and wherein the calculation of the initial relationship is based on the profiled surfaces of the initialization artifact and the at least one calibrated dimension.

38. An apparatus for determining a geometric property of a test object, the apparatus comprising:
   an interferometric profiling system which during operation interferometrically profiles a first surface of the test object with respect to a first datum surface and interferometrically profiles a second surface of the test object with respect to a second datum surface different from the first datum surface; and an electronic processor coupled to the interferometric profiling system, wherein during operation the electronic processor calculates the geometric property based on the interferometrically profiled surfaces and a spatial relationship between the first and second datum surfaces; and a displacement measuring interferometer positioned to measure the spatial relationship between the first and second datum surfaces.

39. The apparatus of claim 38, wherein the interferometric profiling system includes a mount for supporting the test object, wherein the mount is adjustable between a first position for exposing the first surface of the test abject and defining the datum surface and a second position for exposing the second surface of the test object and defining the second datum surface.

40. The apparatus of claim 38, wherein the interferometric profiling system comprises a moveable stage adjustable from a first position defining the first datum surface to a second position defining the second datum surface.

41. An apparatus for determining a geometric property of a test object, the apparatus comprising:

an interferometric profiling system which during operation interferometrically profiles a first surface of the test object with respect to a first datum surface and interferometrically profiles a second surface of the test object with respect to a second datum surface different from the first datum surface; and an electronic processor coupled to the interferometric profiling system, wherein during operation the electronic processor calculates the geometric based on the interferometrically profiled surfaces and a spatial relationship between the first and second datum surfaces, wherein the interferometric profiling system comprises an interferometric optical profiler having a first viewing port for viewing the first surface of the test object and a second viewing port for viewing the second surface of the test object, wherein the first and second surfaces correspond to different sides of the test object.

42. The apparatus of claim 41, wherein the optical profiler comprises a first camera positioned to record a field of view for the first viewing port and a second camera positioned to record a field of view for the second viewing port.

43. The apparatus of claim 41, wherein the optical profiler comprises a camera positioned to record a split field of view for the first and second viewing ports.

44. The apparatus of claim 41, wherein the optical profiler comprises at least one source of EM radiation.

45. An apparatus for determining a geometric property of a test object, the apparatus comprising:

an interferometric profiling system which during operation interferometrically profiles a first surface of the test object with respect to a first datum surface and interferometrically profiles a second surface of the test object with respect to a second datum surface different from the first datum surface; and an electronic processor coupled to the interferometric profiling system, wherein during operation the electronic processor calculates the geometric property based on the interferometrically profiled surfaces and a spatial relationship between the first and second datum surfaces, wherein the interferometric profiling system comprises an interferometric optical profiler having a first viewing port for viewing the first surface of the test object and a second viewing port for viewing the second surface of the test object, and wherein the optical profiler is configured to direct a first portion of EM radiation from a source towards the first viewing port, direct a second portion of the EM radiation towards the second viewing port, and direct at least one additional portion of the EM radiation within the optical profiler.

46. The apparatus of claim 45, wherein the optical profiler comprises a beam splitting optic positioned to reflect the first portion of the EM radiation towards the first viewing port, reflect the second portion of the EM radiation towards the second viewing port, and transmit the at least one additional portion of the incident EM radiation through the beam splitting optic.

47. The apparatus of claim 46, wherein the optical profiler further includes a reflective reference surface positioned to receive the at least one additional portion of the incident EM radiation transmitted through the beam splitting optic.

48. The apparatus of claim 47, wherein the optical profiler further includes a transducer the reference surface for scanning the position of the reflective reference surface.

49. The apparatus of claim 46, wherein the optical profiler further comprises a first viewing port optic supported by a first movable stage, the first viewing port optic positioned to direct at least one part of the first portion of the EM radiation towards the first surface of the test object and the first movable stage adjustable to accommodate the interferometric profiling of the first surface of the test object.

50. The apparatus of claim 49, wherein the optical profiler further comprises a second viewing port optic supported by a second movable stage, the second viewing port optic positioned to direct at least one part of the second portion of the EM radiation towards the second surface of the test object and the second movable stage adjustable to accommodate the interferometric profiling of the second surface of the test object.

51. The apparatus of claim 50 further comprising a displacement measuring interferometer positioned to measure changes in the spatial relationship between the first and second datum surfaces caused by at least one of an adjustment to the first movable stage and an adjustment to the second movable stage.

52. The apparatus of claim 49, wherein the first reflective optic is a roof mirror.

53. The apparatus of claim 49, wherein the optical profiler further includes a first fold mirror for further directing the at least one part of the first portion of the EM radiation towards the first surface of the test object.

54. An apparatus for determining a geometric property of a test object, the apparatus comprising:

an interferometric profiling system which during operation interferometrically profiles a first surface of the test object with respect to a first datum surface and interferometrically files a second surface the test object with respect to a second datum surface different from the first datum surface; and an electronic processor coupled to the interferometric profiling system, wherein during operation the electronic processor calculates the geometric property based on the interferometrically profiled surfaces and a spatial relationship between the first and second datum surfaces, wherein the interferometric profiling system comprises a first interferometric optical profiler for viewing the first surface of the test object and a second interferometric optical profiler for viewing the second surface of the test object.

55. The apparatus of claim 54, wherein the first optical profiler is movable relative to the second optical profiler to adjust the spatial relationship between the first and second datum surfaces.

56. The apparatus of claim 55, further comprising a displacement measuring interferometer positioned to measure changes in the spatial relationship between the first and second datum surfaces caused by relative movement of the first and second optical profilers.

57. An apparatus for determining a geometric property of a test object the apparatus comprising:

an interferometric profiling system which during operation interferometrically profiles a first surface of the test object with respect to a first datum surface and interferometrically profiles a second surface of the test object with respect to a second datum surface different from the first datum surface;

an electronic processor coupled to the interferometric profiling system, wherein during operation the electronic processor calculates the geometric property based on the interferometrically profiled surfaces and a spatial relationship between the first and second datum surfaces; and a gauge object having first and second surfaces, the first surface being positioned to be profiled by the interferometric profiling system with respect to the first datum surface and the second surface being positioned to be profiled by the interferometric profiling system with respect to the second datum surface, wherein the gauge object is positioned to be in a field of view of the interferometric profiling system during interferometric profiling of the test object.

58. The apparatus of claim 57, wherein the electronic processor determines the spatial relationship between the first and second datum surfaces based on interferometric profiling measurements of the first and second surfaces of the gauge object provided by the first and second optical profilers.

59. The apparatus of claim 57, wherein the gauge object has at least one calibrated dimension and wherein the electronic processor determines the spatial relationship between the first and second datum surfaces based on interferometric profiling measurements of the first and second surfaces of the gauge object provided by the first and second optical profilers and the at least one calibrated dimension.

60. An apparatus for determining a geometric property of a test object, the apparatus comprising:

an interferometric profiling system which during operation interferometrically profiles a first surface of the test object with respect to a first datum surface and interferometrically profiles a second surface of the test object with respect to a second datum surface different from the first datum surface; and an electronic processor coupled to the interferometric profiling system, wherein during operation the electronic processor calculates the geometric property based on the interferometrically profiled surfaces and a spatial relationship between the first and second datum surfaces;

wherein the electronic processor uses at least one value indicative of PCOR dispersion in the interferometric profiling system and the test object to calculate the geometric property.

61. An apparatus for determining a geometric property of a test object, the apparatus comprising:

an interferometric profiling system which during operation interferometrically profiles a first surface of the test object with respect to a first datum surface and interferometrically profiles a second surface of the test object with respect to a second datum surface, wherein the interferometric profiling system comprises at least one movable stage for adjusting the position of the first datum surface and the second datum surface;

a displacement measuring interferometer positioned to measure a change in a relative position of the first and second datum surface caused by an adjustment to the at least one movable stage; and an electronic processor coupled to the interferometric profiling system and the displacement measuring interferometer, wherein during operation the electronic processor calculates the geometric property based on the interferometrically profiled surfaces and the relative position of the first and second datum surfaces.

62. The apparatus of claim 61, wherein the interferometric profiling system comprises a second moveable stage, and wherein during operation the first-mentioned movable stage adjusts the position of the first datum surface and the second movable stage adjusts the position of the second datum surface.

63. The apparatus of claim 61, wherein the at least one movable stage comprises a first movable stage adjustable from a first position defining the first datum surface to a second position defining the second datum surface.

64. The apparatus of claim 61, wherein the displacement measuring interferometer provides multiple axes of measurement.

65. The apparatus of claim 61, wherein the interferometric profiling system is a scanning interferometric profiling system using infrared wavelengths.

66. A method for determining a geometric property of a test object, the method comprising:

interferometrically profiling a first surface of the test object with respect to a first datum surface;

interferometrically profiling a second surface of the test object with respect to a second datum surface different from the first datum surface;

determining a spatial relationship between the interferometrically profiled surfaces which accounts for PCOR dispersion; and calculating the geometric property based on the interferometrically profiled surfaces and the spatial relationship.

67. A method for determining a geometric property of a test object, the method comprising:

interferometrically profiling a first surface of the test object with respect to a first datum surface;

interferometrically profiling a second surface of the test object with respect to a second datum surface different from the first datum surface;

providing a spatial relationship between the first and second datum surfaces based on at least one interferometric displacement measurement; and calculating the geometric property based on the interferometrically profiled surfaces and the spatial relationship between the first and second datum surfaces, wherein the first and second surfaces of the test object are interferometrically profiled from a common side and the first and second datum surfaces are spaced from one another by a distance greater than a profiling range η of an interferometry system used for the interferometric profiling steps.

68. The method of claim 67, wherein the interferometry system used for the interferometric profiling steps comprises a reference object having a partially reflective, first surface and a reflective, second surface, the first surface defining a position of the first datum surface and the second surface defining a position of the second datum surface.

69. The method of claim 68, wherein the relationship is defined by the spatial separation between the first and second surfaces of the reference object.

70. An optical profiling system comprising:

a broadband source;

a scanning interferometer which during operation separates input light into a first wavefront and a second wavefront, directs the first wavefront along a reference path including a partially reflective first surface and a reflective second surface and the second wavefront along a measurement path contacting a measurement object, and, after the second wavefront contacts the measurement object, combines the wavefronts to produce an optical interference pattern;

a detector producing interference data in response to the optical interference pattern;

an electronic processor coupled to the detector for analyzing the interference data a scanning controller coupled to the scanning interferometer and the electronic processor, wherein during operation the scanning controller causes the scanning interferometer to adjust the position of the first and second surfaces.

71. The interferometry system of claim 70, wherein the partially reflective first surface of the scanning interferometer defines a position of a first datum surface and the reflective second surface defines a position of a second datum surface, and wherein during operation the electronic processor calculates a geometric property of the test object based on the interference data and a relationship between the first and second datum surfaces.

* * * * *

UNITED STATES PATENT AND TRADEMARK OFFICE
CERTIFICATE OF CORRECTION

PATENT NO. : 6,822,745 B2
DATED : November 23, 2004
INVENTOR(S) : James F. Biegen et al.

It is certified that error appears in the above-identified patent and that said Letters Patent is hereby corrected as shown below:

Title page,
Item [56], References Cited, OTHER PUBLICATIONS,
"Lewis" reference, insert -- : -- between "5" and "694"

Column 29,
Line 22, replace "tile" with -- the --

Column 30,
Line 34, replace "surface" with -- surfaces --
Line 37, replace "a" with -- an --

Column 31,
Line 13, replace "abject" with -- object --
Line 31, insert -- property -- between "geometric" and "based"

Column 32,
Line 18, insert -- coupled to -- between "transducer" and "the"
Line 18, insert -- reflective -- before "reference"
Line 52, replace "files" with -- profiles --
Line 52, insert -- of -- between "surface" and "the"

Column 33,
Line 9, insert -- , -- after "object"

Signed and Sealed this

Twenty-fourth Day of May, 2005

JON W. DUDAS
*Director of the United States Patent and Trademark Office*